United States Patent [19]

Miyajima

[11] Patent Number: 5,626,808
[45] Date of Patent: May 6, 1997

[54] METHOD OF MANUFACTURING HOLLOW RESIN MOLDING

[75] Inventor: Hidenobu Miyajima, Shizuoka, Japan

[73] Assignee: Asahi Tec Corporation, Shizuoka, Japan

[21] Appl. No.: 509,097

[22] Filed: Aug. 1, 1995

Related U.S. Application Data

[62] Division of Ser. No. 353,217, Dec. 1, 1994, Pat. No. 5,538,571.

[30] Foreign Application Priority Data

Dec. 1, 1993 [JP] Japan ................................ 5-301601
Dec. 1, 1993 [JP] Japan ................................ 5-301602

[51] Int. Cl.[6] ........................................... B29C 43/18
[52] U.S. Cl. .................. 264/161; 29/455.1; 29/523; 264/250; 264/262; 264/322; 264/544
[58] Field of Search ........................ 264/161, 250, 264/261, 262, 322, 544; 29/455.1, 523

[56] References Cited

U.S. PATENT DOCUMENTS 3,356,778  12/1967  Anderson ..................... 264/262 X

FOREIGN PATENT DOCUMENTS 74456  3/1983  European Pat. Off. .......... 264/262

Primary Examiner—Leo B. Tentoni
Attorney, Agent, or Firm—Sughrue, Mion, Zinn, Macpeak & Seas

[57] ABSTRACT

An internal molding having a predetermined shape of a hollow portion of a manifold is integrally molded by blow molding or the like, and external molding elements having a predetermined shape of the exterior of the manifold and being split into a plurality of parts are molded. The internal molding is integrated with the external molding elements by adhesion or fusion. Further, an external molding is molded, and an internal molding having a shape substantially identical with or smaller than a predetermined shape of a hollow portion of the hollow resin molding is integrally molded. Then, the internal molding is softened by arranging the internal molding inside the external molding and heating the internal molding, and the inside of the internal molding is thereafter pressurized to cause the internal molding to contact the external molding, so that the internal molding is integrated with the external molding. Still further, an internal molding is integrated with an external molding elements by an appropriate joining means. Then, a flange member is fitted to a first connecting portion formed by the respective external molding elements and the internal molding. Still further, an internal molding is integrated with an external molding elements by an appropriate joining means. Then, a seal member is inserted into a gap portion at an end portion of the hollow resin molding as well as between the external molding and the internal molding.

11 Claims, 22 Drawing Sheets

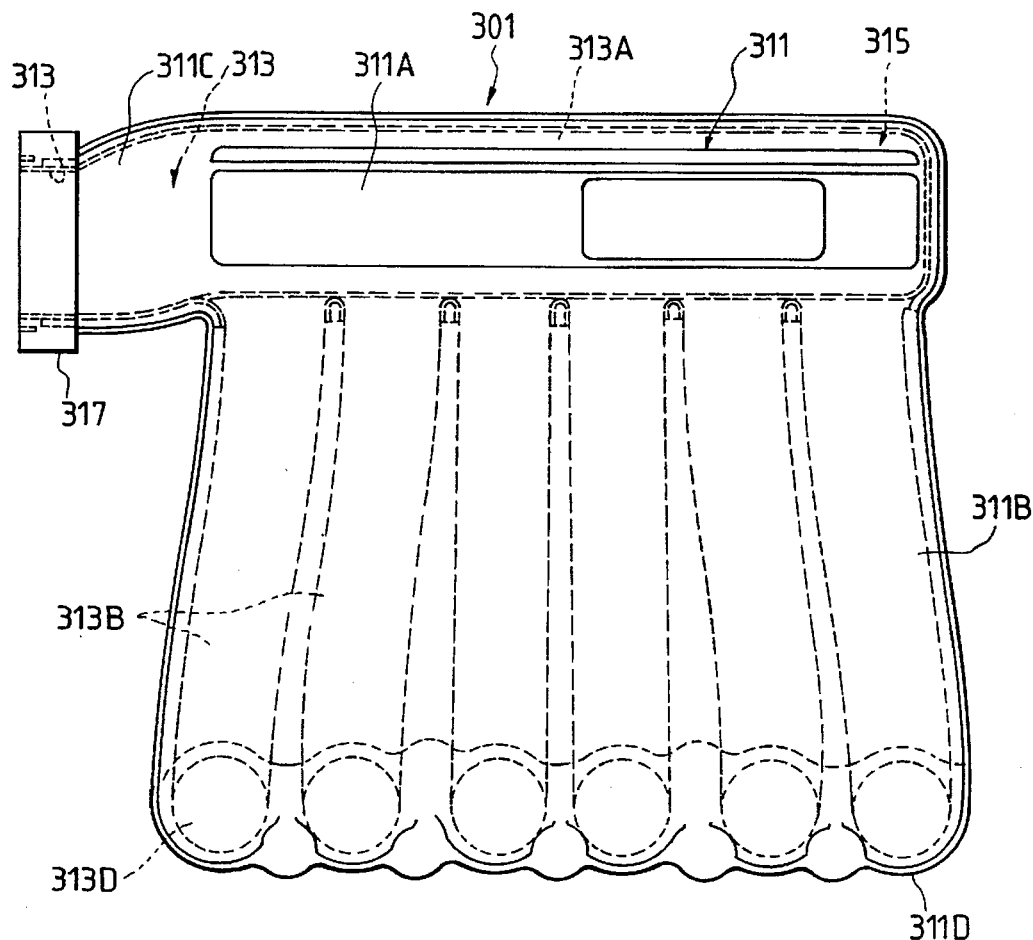
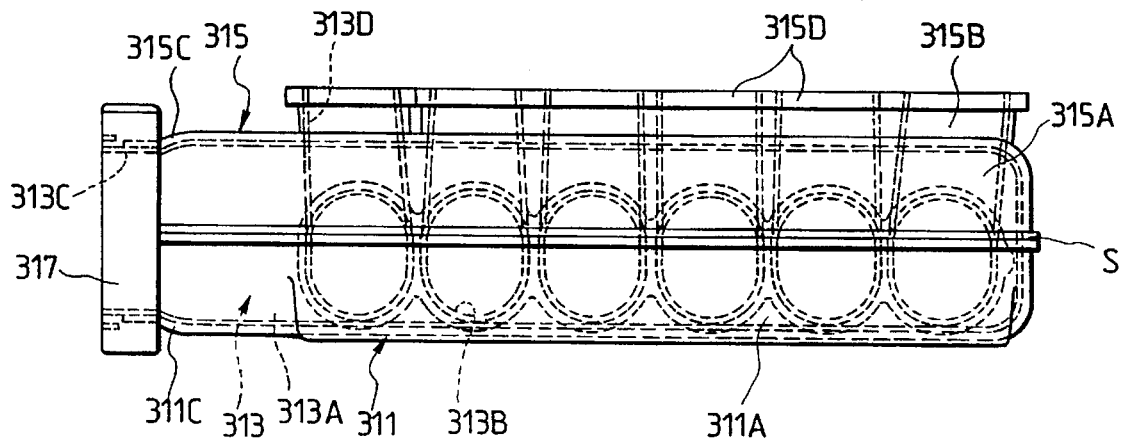

5,626,808

METHOD OF MANUFACTURING HOLLOW RESIN MOLDING

This is a divisional of application Ser. No. 08/353,217 filed Dec. 1, 1994, now issued as U.S. Pat. No. 5,538,571.

BACKGROUND OF THE INVENTION

This invention relates to method of manufacturing hollow resin molding. A manifold made of synthetic resin used for an intake manifold of an automobile is a kind of hollow resin molding. Such manifold is formed by integrating a gas sucking portion, cylinder head connecting portions, and branch pipes for connecting both the gas sucking portion and the cylinder head connecting portions together. The manifold has therefore a complicated shape. Various manufacturing methods are available.

As shown in FIG. 15, a first method involves the steps of: forming a core 101 having the shape of a hollow portion of a manifold using a low melting point alloy; molding a manifold 103 made of synthetic resin over the outer circumference of the core by injection molding; and melting the core 101 made of the low melting point alloy thereafter to obtain the manifold having a predetermined shape.

As shown in FIG. 16, a second method involves the steps of: integrally molding an internal molding 105 having the shape of a hollow portion of a manifold by blow molding; reinforcing the internal molding by charging sand, water, or the like 107 thereinto; and integrating an external molding 109 over the outer circumference of the internal molding by injection molding to obtain the manifold with the predetermined shape.

As shown in FIG. 17, a third method involves the steps of: integrally molding an internal molding 111 having a predetermined shape of a hollow portion of a manifold by blow molding; and integrating an external molding 113 over the outer circumference of the internal molding by reactive injection molding to obtain the manifold with the predetermined shape.

As shown in FIG. 18, a fourth method involves the step of joining molding elements 115, 117 having a predetermined shape of a manifold and being split into a plurality of parts to each other by adhesion or fusion to obtain the manifold with the predetermined shape. Further, as shown in FIGS. 19, 20, a fifth method involves the steps of: molding internal molding elements 119 having a predetermined shape of a hollow portion of a manifold; combining these elements together to form an internal structural body 121; and integrating an external molding 123 over the outer circumference of the internal structural body 121 by injection molding to obtain the manifold with the predetermined shape.

The aforementioned conventional constructions have addressed the following problems. First, in the first method the core 101 made of the low melting point alloy is heavy and therefore hard to handle, and the process of melting the core made of the low melting point alloy is cumbersome as well. In the second and third methods pressure is applied during injection molding to deform the internal molding, which makes it necessary to give some special measure such as reinforcement.

Further, in the fourth and fifth methods asperities are formed on the joining surfaces for adhesion, which results in defects on the inner surface of the hollow portion of the manifold, although there is no problem of injection molding.

SUMMARY OF THE INVENTION

The invention has been made in view of the aforementioned problems. Accordingly, a first object of the invention is to provide a method of manufacturing a manifold made of a synthetic resin that is free from defects on the inner surface of the hollow portion of a hollow resin molding and which is easy to manufacture. A second object of the invention is to provide a method of manufacturing a hollow resin molding by which an internal molding is caused to contact an external molding. A third object of the invention is to provide a method of manufacturing a manifold made of a synthetic resin that has a two-layered structure achieving seamless at flange surfaces in connecting portions (a gas sucking portion, a cylinder head connecting portion, and the like). A fourth object of the invention is to provide a method of manufacturing a hollow resin molding that has no gap portion at an end portion of a hollow portion of the hollow resin molding and therefore to eliminate problems arising from the presence of the gap portion.

To achieve the first object, the invention is applied to a method of manufacturing a manifold made of a synthetic resin involving the following steps. An internal molding having a predetermined shape of a hollow portion of the manifold is molded by blow molding or the like. External molding elements having a predetermined shape of the exterior of the manifold and being split into a plurality of parts are molded by blow molding, injection molding, or the like. The internal molding is integrated with the external molding elements by adhesion or fusion. As a result of this process, a manifold made of synthetic resin can be manufactured in such a manner that the manifold is free from defects on the inner surface of the hollow portion. Furthermore, the lightness and easy handling during the integrating process as well as no need for injection molding and hence for reinforcement are additional advantages to facilitate the production.

To achieve the second object, the invention is applied to a method involving the following steps. An external molding having a predetermined shape of the exterior of a hollow resin molding is first formed. The inner shape of the external molding is substantially identical with a predetermined shape of the interior of the hollow resin molding or thinner in consideration of the thickness of an internal molding. An internal molding has a shape substantially identical with or smaller than a predetermined shape of a hollow portion of the hollow resin molding. Then, the internal molding is arranged inside the external molding and softened by heating the internal molding, and the inside of the internal molding is thereafter pressurized to cause the internal molding to contact the external molding, so that the internal molding is integrated with the external molding. As a result of this process, a hollow resin molding free from gap can be manufactured. In the case of a manifold, a product free from defects on the inner surface of the hollow portion can be manufactured.

To achieve the third object, the invention is applied to a method involving the following steps. An internal molding having a predetermined shape of a hollow portion of a manifold and external molding elements having a predetermined shape of the exterior of the manifold and being split into a plurality of parts are molded. No flange is formed on the connecting side of the external molding elements. Then, the internal molding is integrated with the external molding elements by an appropriate joining means such as adhesion and fusion. A completely shaped flange member is thereafter fitted to the connecting portion formed by the respective external molding elements and the internal molding. As a result of this process, a manifold made of synthetic resin can be provided in such a condition that no joint line is formed on the flange surface at the connecting portion and therefore involves no secondary working on the flange surface.

To achieve the fourth object, the invention is applied to a method of manufacturing a hollow resin molding involving the following steps. An external molding having a predetermined shape of the exterior of the hollow resin molding is formed. An internal molding having a predetermined shape of a hollow portion of the hollow resin molding is formed. The internal molding is integrated with the external molding by arranging the internal molding inside the external molding. In such a method, a seal member is inserted into a gap portion at an end portion of the hollow resin molding as well as between the external molding and the internal molding. As a result of this process, a hollow resin molding capable of preventing infiltration of a fluid passing through the hollow portion can be provided.

BRIEF DESCRIPTION OF THE DRAWINGS

The invention will be disclosed in detail with reference to the following drawings wherein:

FIG. 32 is a diagram showing an eleventh embodiment of the invention and, more specifically, a front view showing respective moldings being fabricated.

FIG. 33 is a diagram showing the eleventh embodiment of the invention and, more specifically, a plan view of FIG. 32.

DETAILED DESCRIPTION OF THE PREFERRED EMBODIMENTS

Embodiment 1

Figure 1:
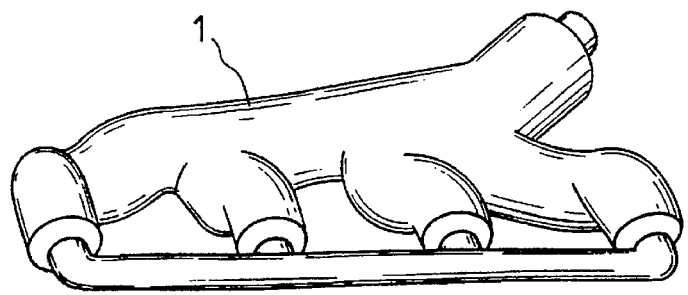
FIG. 1 is a diagram showing a first embodiment of the invention and, more specifically, a perspective view showing an internal molding.
Figure 3:
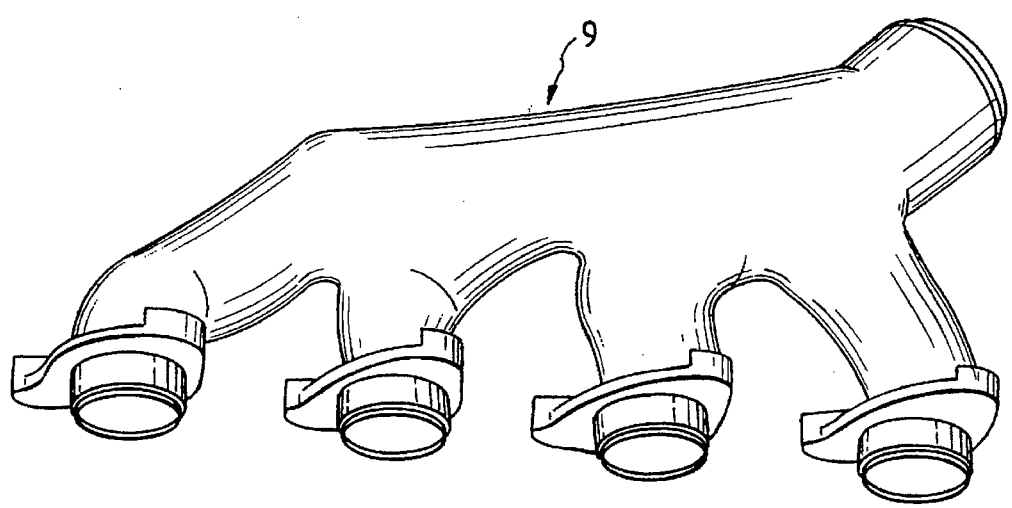
FIG. 3 is a diagram showing the first embodiment of the invention and, more specifically, a perspective view showing the internal molding integrated with the external molding elements.
Figure 4:
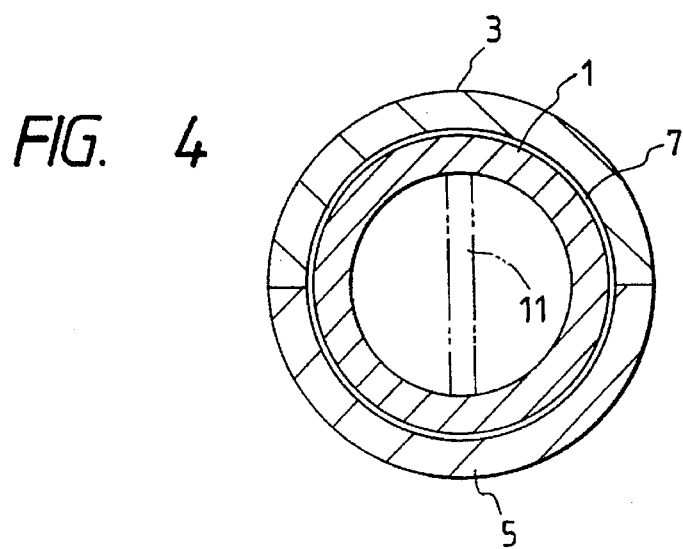
FIG. 4 is a diagram showing the first embodiment of the invention and, more specifically, a sectional view showing the internal molding integrated with the external molding elements.
Figure 2:
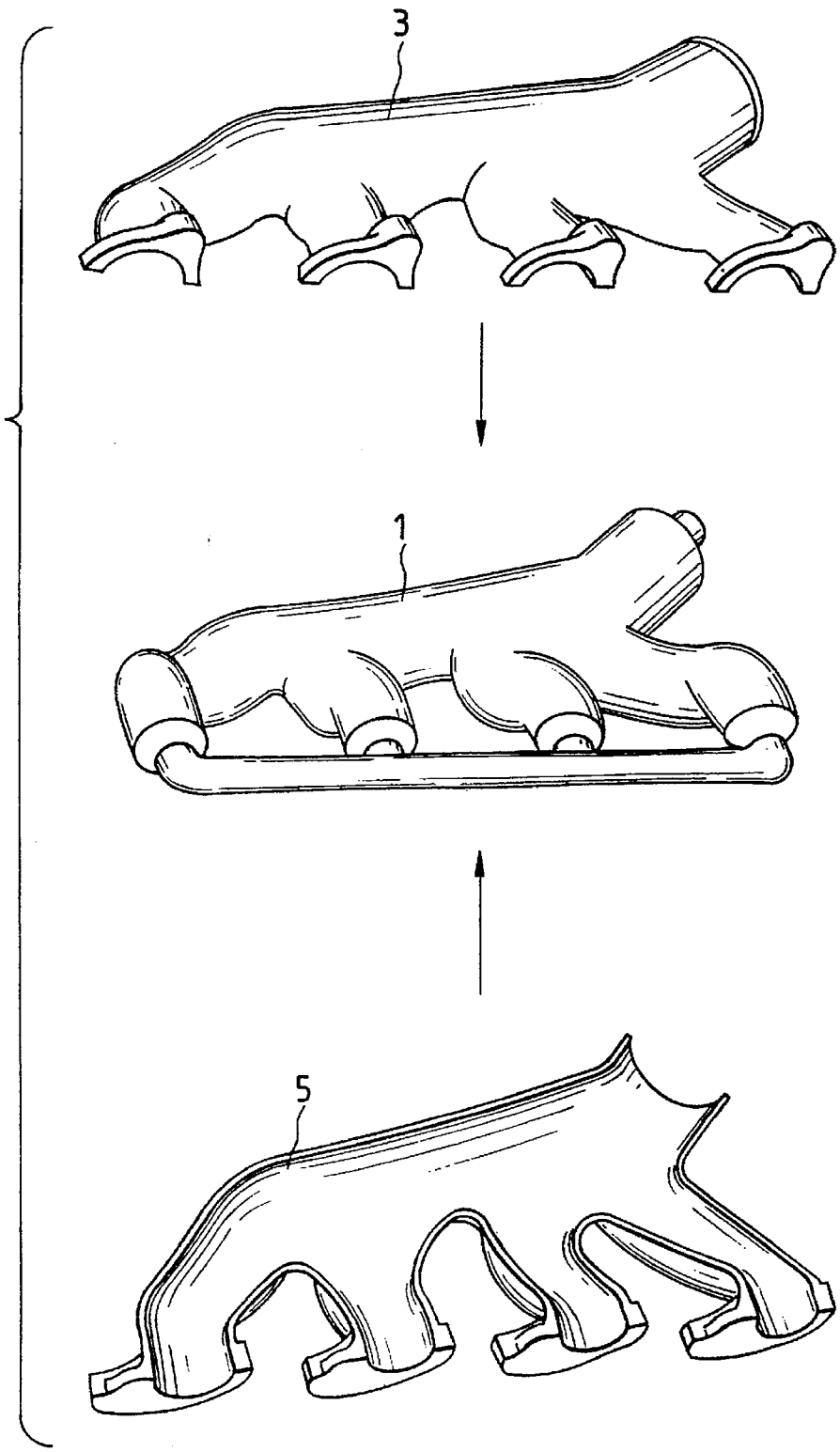
FIG. 2 is a diagram showing the first embodiment of the invention and, more specifically, a perspective view showing an arrangement of the internal molding and external molding elements.

A first embodiment of the invention will now be described with reference to FIGS. 1 to 4. FIGS. 1 to 3 show process parts of a manifold; and FIG. 4 shows a section of a branch pipe of the manifold. First, an internal molding 1 having a predetermined shape of the hollow portion of the manifold shown in FIG. 1 is molded. This internal molding 1 is integrally formed by blow molding. That is, a cavity portion having an internal shape of the hollow portion of the manifold is formed between the upper and lower molds, and air or the like is charged into the cavity portion between the upper and lower molds with a parison interposing therebetween. As a result of this process, the parison is molded in the form of a thin film along the shape of the cavity portion.

Then, as shown in FIG. 2, external molding elements 3, 5 having a predetermined shape of the exterior of the manifold are thereafter molded. These elements 3, 5 are formed by injection molding on an element basis. In this embodiment the external molding elements 3, 5 are split into two parts in the direction of circulation of the manifold. The outer surfaces of these elements 3, 5 are formed into the predetermined shape of the exterior of the manifold, whereas the inner surfaces thereof are formed into the same shape as the outer surface of the internal molding and serve as portions for adhesion to the internal molding 1.

Then, as shown in FIG. 4, an adhesive 7 is applied to the outer surface of the internal molding 1, and is thereafter enclosed by the external molding elements 3, 5 from top and bottom and pressed. As a result of this process, the internal molding 1 and the external molding elements 3, 5 are integrated with one another to form a manifold 9 having such a predetermined shape as shown in FIG. 3 as a finished product.

The aforementioned first embodiment provides the following advantages. The manifold 9 free from defects within the hollow portion can be manufactured. This advantage is provided by the fact that the internal molding 1 is integrally formed by blow molding, and this process is effective in providing gas permeability that is required for the manifold 9. In addition, since the internal molding 1 is integrated with the external molding elements 3, 5 by adhesion, the internal molding 1 is light and hence easy to handle. No need for injection molding further eliminates the need for such a reinforcement 11 shown by two dot chain line in FIG. 4, which hence ensures easy manufacture. Incidentally, although the adhesion portions are exposed to the outer surface of the manifold 9 because the external molding elements 3, 5 are caused to adhere to each other, this does not affect the performance of the manifold 9.

Embodiment 2

Figure 5:
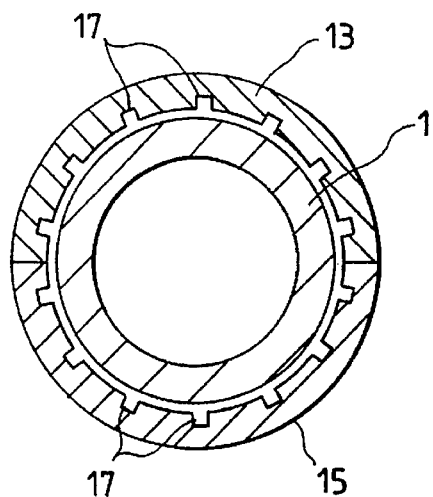
FIG. 5 is a diagram showing the second embodiment of the invention and, more specifically, a sectional view showing the internal molding integrated with the external molding elements.

A second embodiment will be described next with reference to FIG. 5. The second embodiment is characterized as forming groove portions 17 on the inner surfaces of external molding elements 13, 15. The groove portions 17 serve as spaces for releasing the adhesive. Grooves or recesses are arranged at an interval. Therefore, a manifold free from defects on the inner surface of the hollow portion can be manufactured in this embodiment, which makes the internal molding 1 light and hence easy to handle. Since injection molding is not involved, no reinforcement is necessary and the manifold is therefore easy to make. In addition, the arrangement of the groove portions 17 allows the superfluous adhesive to be driven out thereinto, which improves the adhering strength.

Embodiment 3

Figure 6:
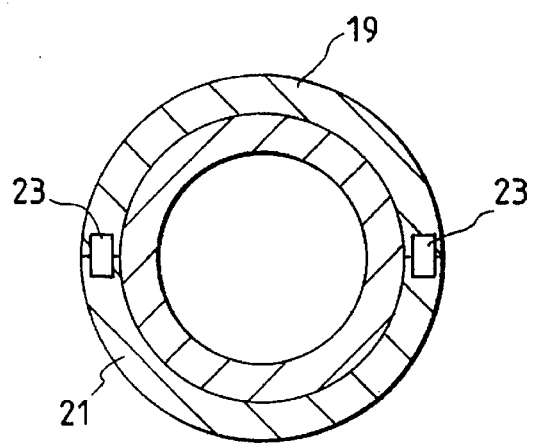
FIG. 6 is a diagram showing the third embodiment of the invention and, more specifically, a sectional view showing the internal molding integrated with the external molding elements.

A third embodiment will be described next with reference to FIG. 6. The third embodiment is characterized as forming groove portions 23 on the joining surfaces of external molding elements 19, 21 instead of forming the groove portions on the inner surfaces of the external molding elements as in the case of Embodiment 2. This embodiment too can provide advantages similar to that of the embodiment 2.

Embodiment 4

Figure 7:
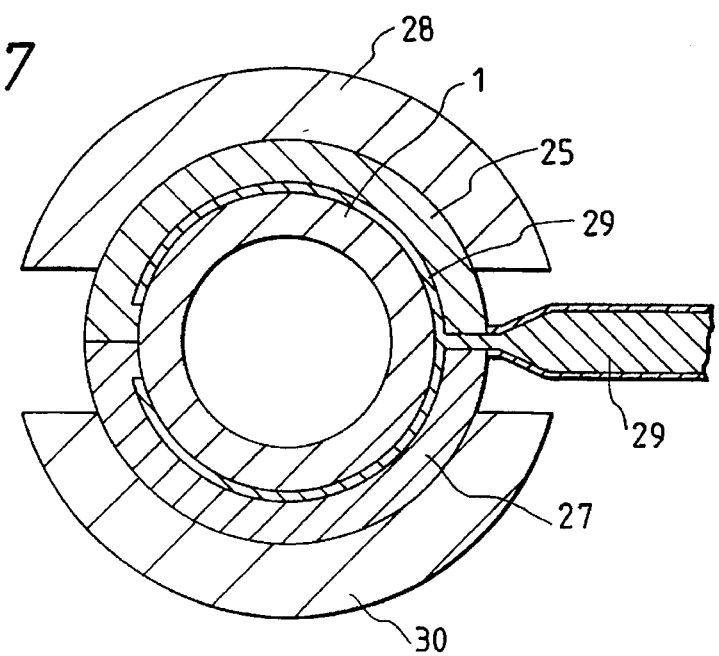
FIG. 7 is a diagram showing the fourth embodiment of the invention and, more specifically, a sectional view showing the internal molding integrated with the external molding elements.

A fourth embodiment will be described next with reference to FIG. 7. The fourth embodiment is characterized as involving the steps of: first molding external molding elements 25, 27 so as to interpose a gap with respect to the internal molding 1; and then causing the external molding elements 25, 27 to contact the internal molding 1 by using press molds 28, 30 and, at the same time, charging an adhesive 29 into the gap with a charging unit at an extremely low pressure. This embodiment too can provide advantages similar to those of the aforementioned embodiments. In addition, since the adhesive 29 charging pressure can be made very low, the integration process can be performed without deforming the internal molding 1.

Embodiment 5

Figure 8:
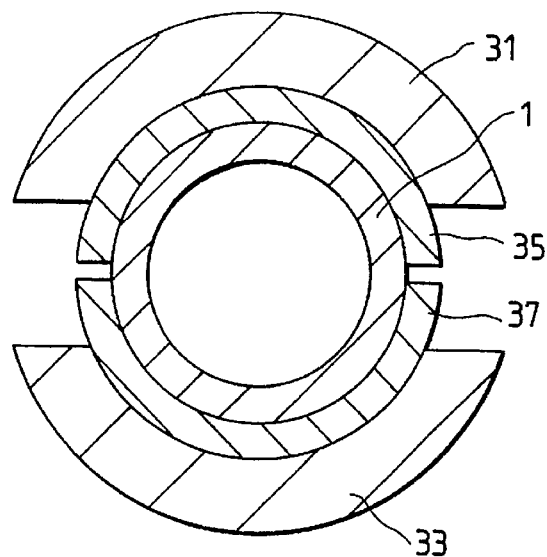
FIG. 8 is a diagram showing the fifth embodiment of the invention and, more specifically, a sectional view showing the internal molding integrated with the external molding elements.

A fifth embodiment will be described next with reference to FIG. 8. The fifth embodiment is characterized as utilizing a high frequency vibration fusion method in place of adhesion. That is, by this method, the internal molding 1 is integrated with the external molding elements 35, 37 by causing external molding elements 35, 37 to contact the internal molding 1 and applying high frequency vibrations to fuse joining surfaces of the external molding elements 35, 37 utilizing vibrators 31, 33.

Embodiment 6

Figure 9:
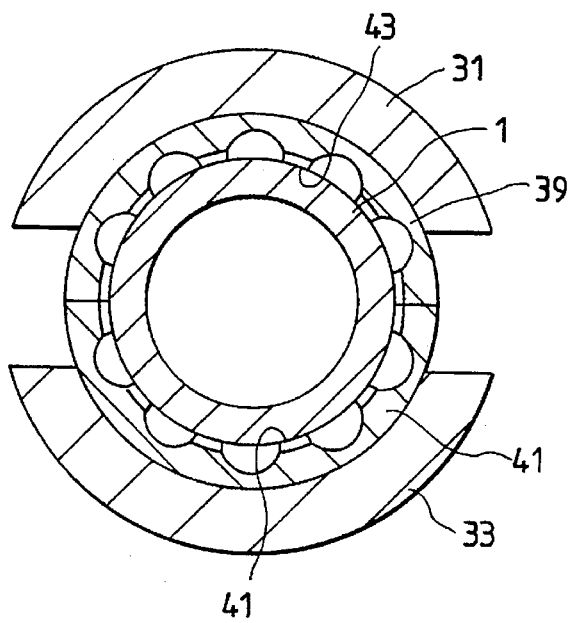
FIG. 9 is a diagram showing the sixth embodiment of the invention and, more specifically, a sectional view showing the internal molding integrated with the external molding elements.

A sixth embodiment will be described next with reference to FIG. 9. The sixth embodiment is characterized as integrating the internal molding with the external molding elements with the inner surfaces of the external molding elements serving as portions to be fused, unlike Embodiment 5 in which the joining surfaces of the external molding elements are fused with each other. This method involves the steps of: forming recesses at an interval on the inner surfaces of external molding elements 39, 41 to form a plurality of projected portions 43; causing the external molding elements 39, 41 to contact the internal molding 1 and applying high frequency vibrations to the internal molding 1 and the external molding elements 39, 41 utilizing the vibrators 31, 33 to thereby fuse the joining surfaces of the projected portions 43 and the joining surface of the internal molding 1 for the integration of the internal molding 1 with the external molding elements 39, 41. This embodiment too can provide advantages similar to that of the embodiment 5.

Embodiment 7

Figure 10:
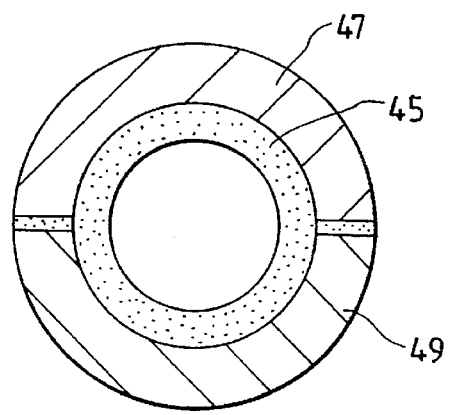
FIG. 10 is a diagram showing the seventh embodiment of the invention and, more specifically, a sectional view showing the internal molding integrated with the external molding elements.

A seventh embodiment will be described next with reference to FIG. 10. The seventh embodiment is characterized as fusing the internal molding with the external molding elements using both a synthetic resin with a mixture of electrically conducting whiskers and an ordinary synthetic resin with no mixture of such whiskers. That is, an internal molding 45 is molded with the electrically conducting whiskers mixed therein. The synthetic resin material having a mixture of electrically conducting whiskers exhibits the property of being heated when a high frequency wave is applied thereto. On the other hand, external molding elements 47, 49 are formed of the ordinary synthetic resin. The external molding elements 47, 49 are fused with the internal molding 45 using press molds, and then a high frequency wave is applied to the fused body. As a result of this process, the internal molding 45 is integrated with the external molding elements 47, 49 by fusion with the internal molding 45 being heated and with the external molding elements 47, 49 being at room temperature.

Embodiment 8

Figure 11:
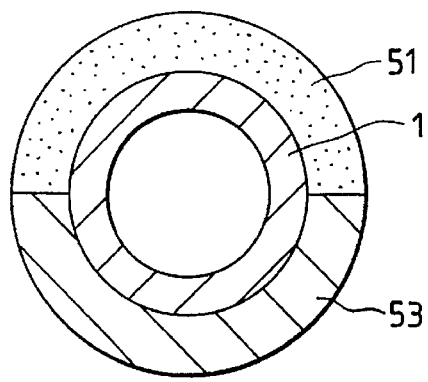
FIG. 11 is a diagram showing the eighth embodiment of the invention and, more specifically, a sectional view showing the internal molding integrated with the external molding elements.
Figure 12:
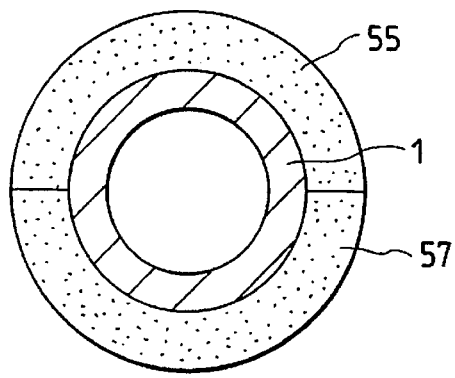
FIG. 12 is a diagram showing the eighth embodiment of the invention and, more specifically, a sectional view showing the internal molding integrated with the external molding elements.

FIG. 11 shows a modified example of Embodiment 7. The internal molding and two split external molding elements 51, 53 are fused at the joining surfaces of the external molding elements 51, 53 with the external molding element 51 being made of a synthetic resin with a mixture of electrical conducting whiskers and the external molding element 53 being made of an ordinary synthetic resin. Further, FIG. 12 similarly shows a modified example, in which the internal molding 1 is fused with the joining surfaces of external molding elements 55, 57. The external molding elements are made of a synthetic resin with a mixture of electrically conducting whiskers. This embodiment too can provide advantages similar to that of the embodiment 7.

Embodiment 9

Figure 13:
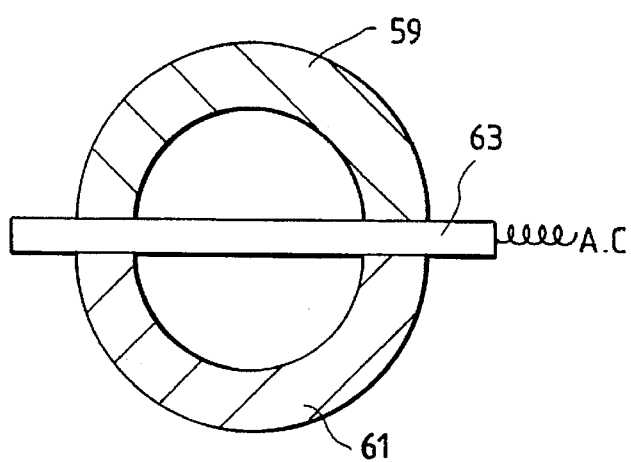
FIG. 13 is a diagram showing a ninth embodiment of the invention and, more specifically, a sectional view showing external molding elements interposing a heating plate therebetween.
Figure 14:
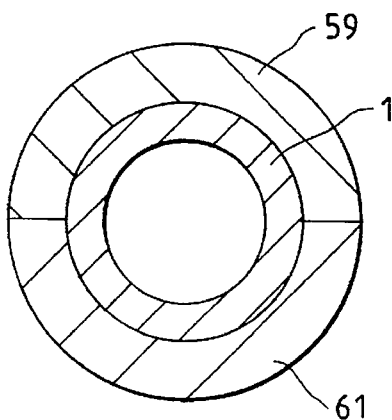
FIG. 14 is a diagram showing the ninth embodiment of the invention and, more specifically, a sectional view showing the internal molding integrated with the external molding elements.
Figure 15:
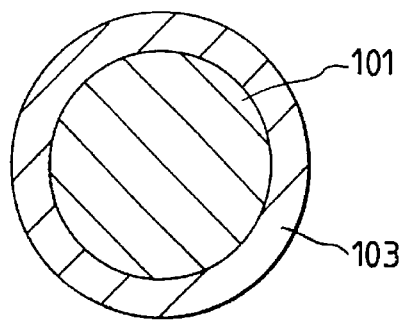
FIG. 15 is a diagram showing a conventional example and, more specifically, a sectional view showing a method of molding a manifold.
Figure 16:
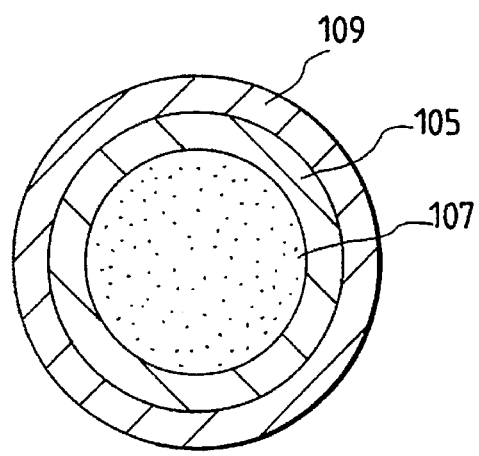
FIG. 16 is a diagram showing a conventional example and, more specifically, a sectional view showing a method of molding a manifold.
Figure 17:
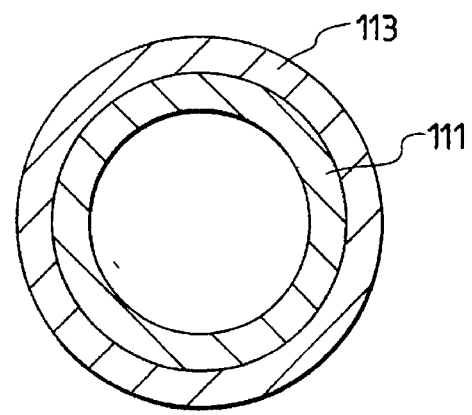
FIG. 17 is a diagram showing a conventional example and, more specifically, a sectional view showing a method of molding a manifold.
Figure 18:
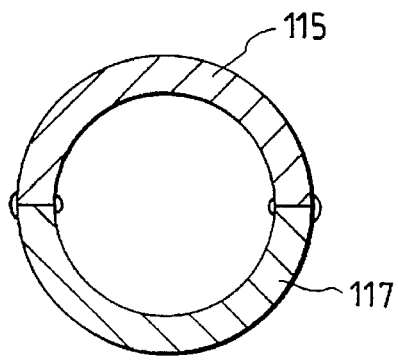
FIG. 18 is a diagram showing a conventional example and, more specifically, a sectional view showing a method of molding a manifold.
Figure 19:
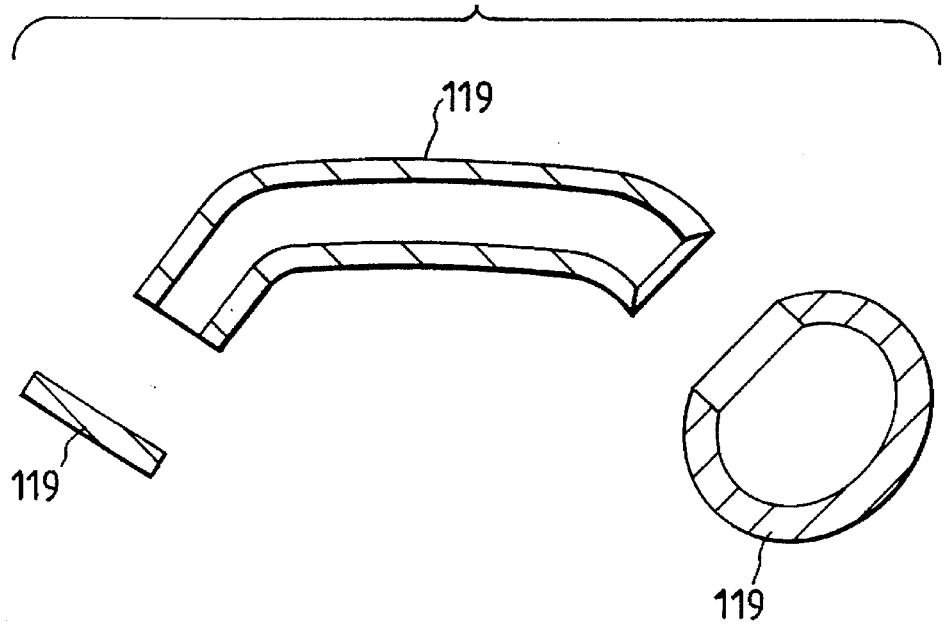
FIG. 19 is a diagram showing a conventional example and, more specifically, an exploded sectional view showing an internal molding.
Figure 20:
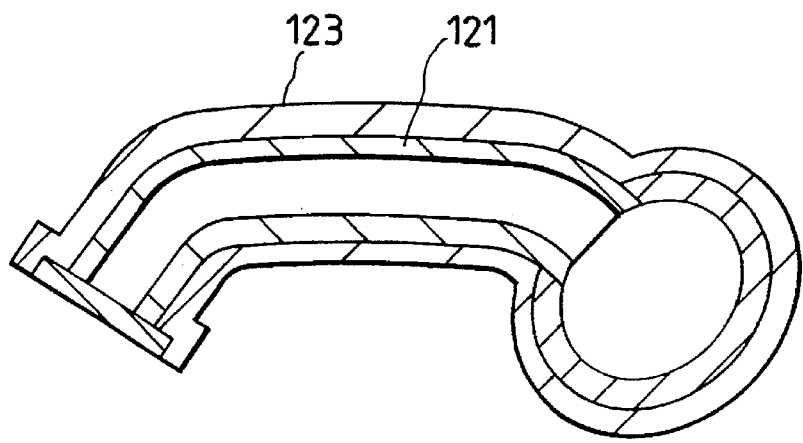
FIG. 20 is a diagram showing the conventional example and, more specifically, a sectional view showing the internal molding with an external molding enclosed thereover.

A ninth embodiment will be described next with reference to FIGS. 13 and 14. The ninth embodiment is characterized as fusing the internal molding with the external molding elements by heating the joining surfaces of the external molding elements by means of heating plate fusion. As shown in FIG. 13, this method involves the steps of: first causing external molding elements 59, 61 to interpose a heating plate 63 therebetween, and thereafter separating the external molding elements 59, 61 from each other when the heating plate has been heated to a predetermined temperature; and then causing the external molding elements 59, 61 to contact the internal molding 1 and fusing the joining surfaces of the external molding elements 59, 61 with each other to thereby integrate the internal molding 1 with the external molding elements.

It should be noted that the invention is not limited to the aforementioned embodiments. For example, while the external molding elements 3, 5 are split into two parts in the direction of circulation of the manifold in the aforementioned embodiments, not only the number of parts into which the external molding elements are split can be arbitrarily selected, but also how the external molding elements are split can also be arbitrarily selected. Further, while the internal molding 1 is formed by blow molding, vacuum molding or the like may be employed as well. Furthermore, the internal molding 1 is not necessarily film-like.

Embodiment 10

Figure 21:
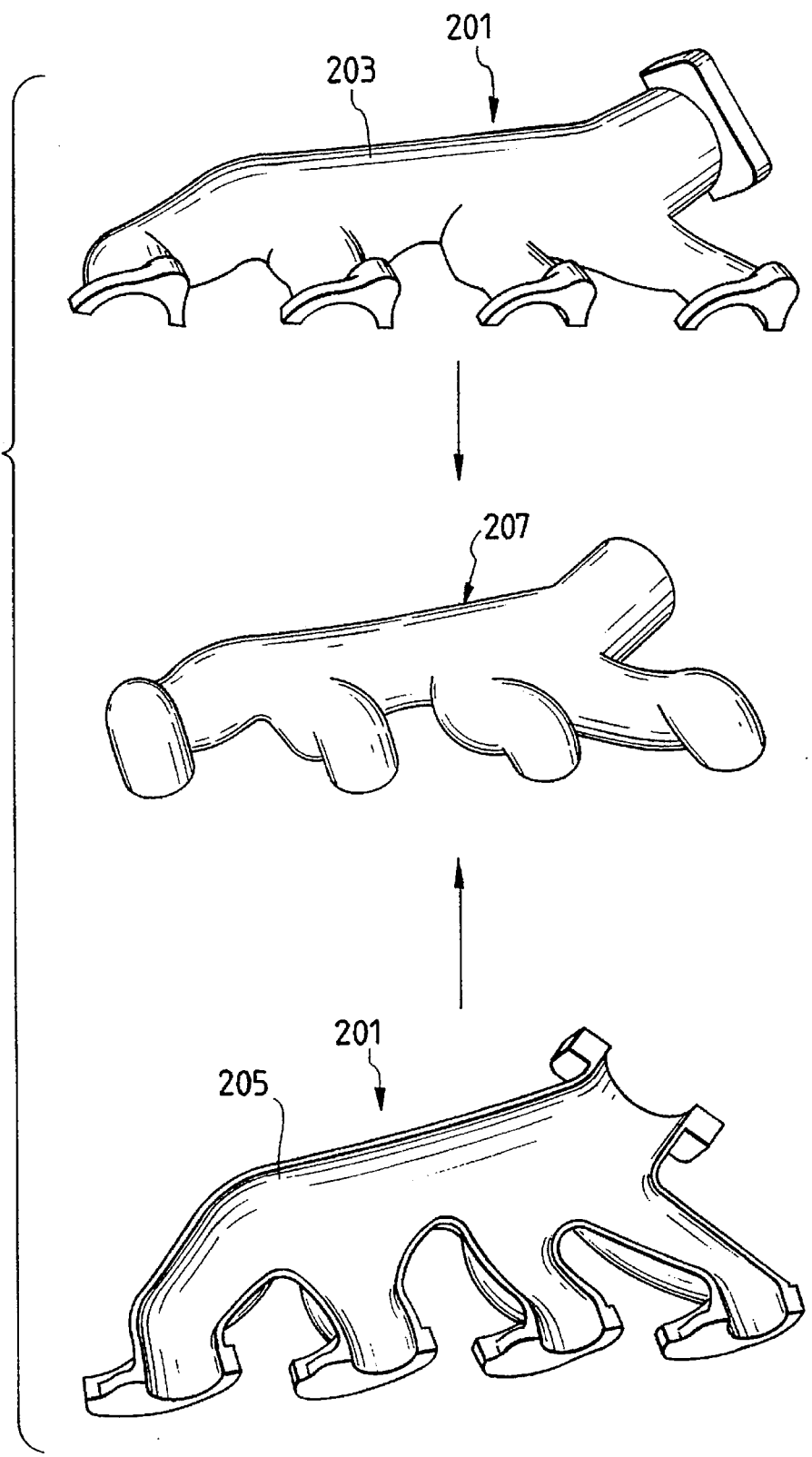
FIG. 21 is a diagram showing a tenth embodiment of the invention and, more specifically, a perspective view showing the construction of an internal molding and an external molding.
Figure 22:
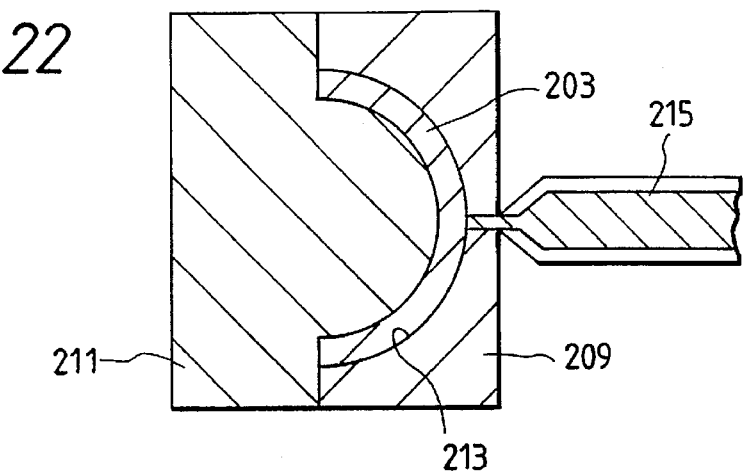
FIG. 22 is a diagram showing the tenth embodiment of the invention and, more specifically, a sectional view showing a mold for an external molding element.
Figure 23:
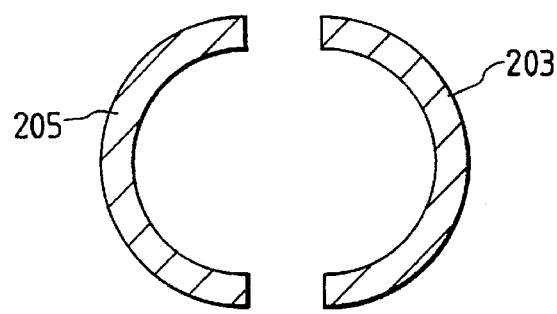
FIG. 23 is a diagram showing the tenth embodiment of the invention and, more specifically, a sectional view showing a pair of external molding elements.

A tenth embodiment will be described next with reference to FIGS. 21 to 31. FIG. 21 shows process parts of a manifold made of a synthetic resin. The process parts include: external molding elements 203, 205 forming an external molding 201; and an internal molding 207. The external molding 201 is formed of the multiply split external molding elements 203, 205 that have a predetermined shape of the exterior of the manifold. In this embodiment, the external molding elements 203, 205 are split into two parts in the direction of circulation of the manifold; the outer surfaces thereof are such as to have a predetermined shape to the exterior of the manifold; and the inner surfaces thereof are such as to be almost identical with a predetermined shape of the interior of the manifold or thinner by the thickness of the internal molding 207. The external molding elements 203, 205 are formed by injection molding. As shown in FIGS. 22 and 23, a resin 215 is charged into a cavity 213 formed between an upper mold 209 and a lower mold 211. As a result of this process, the external molding elements 203, 205, each having a predetermined shape, are formed.

Figure 24:
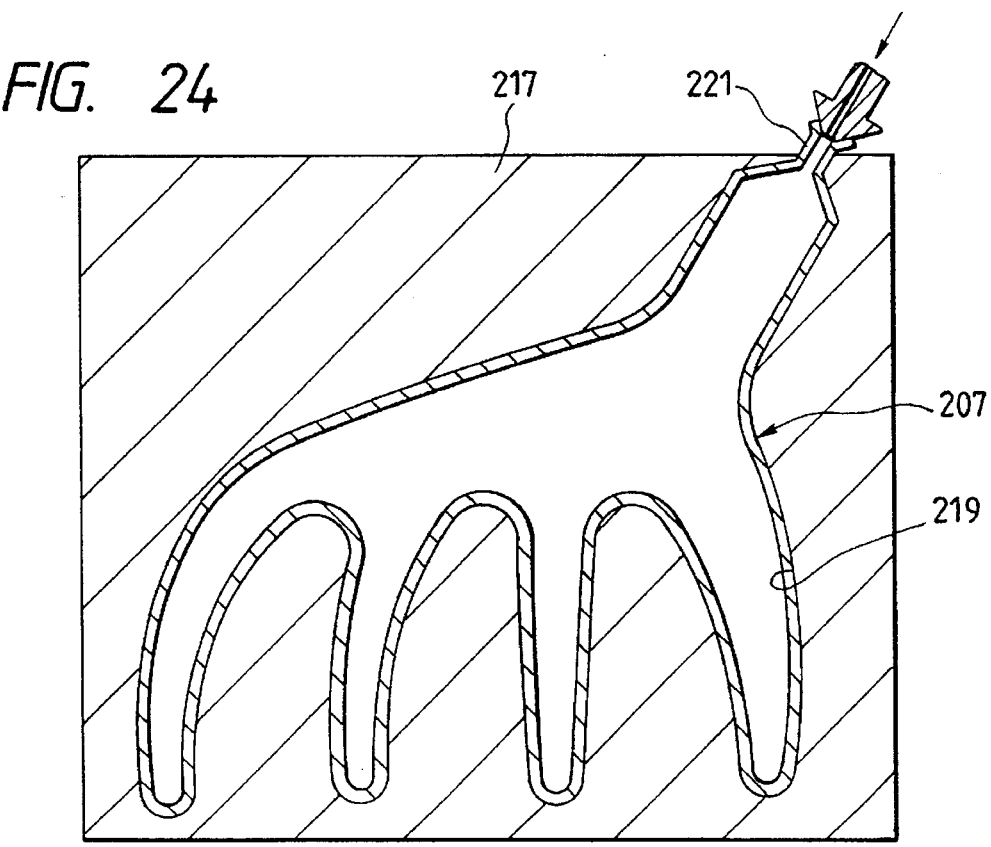
FIG. 24 is a diagram showing the tenth embodiment of the invention and, more specifically, a sectional view showing a mold for the internal molding element.

Then, the internal molding 207 such as shown in FIG. 21 is formed. The internal molding 207 is formed so as to be almost identical with a predetermined shape of a hollow portion of the manifold or smaller than such hollow portion. The internal molding 207 is integrally formed by blow molding. That is, as shown in FIG. 24, a cavity portion 219 having the shape of the interior of the hollow portion of the manifold is formed between a pair of blow molds 217 (only one of the pair is shown in FIG. 24); a bottomed cylindrical parison is interposed between the pair of blow molds 217; and then air or the like is blown from a blow inlet 221. As a result of this process, the parison is formed into a film along the shape of the cavity portion so that the internal molding 207 can be formed.

Figure 25:
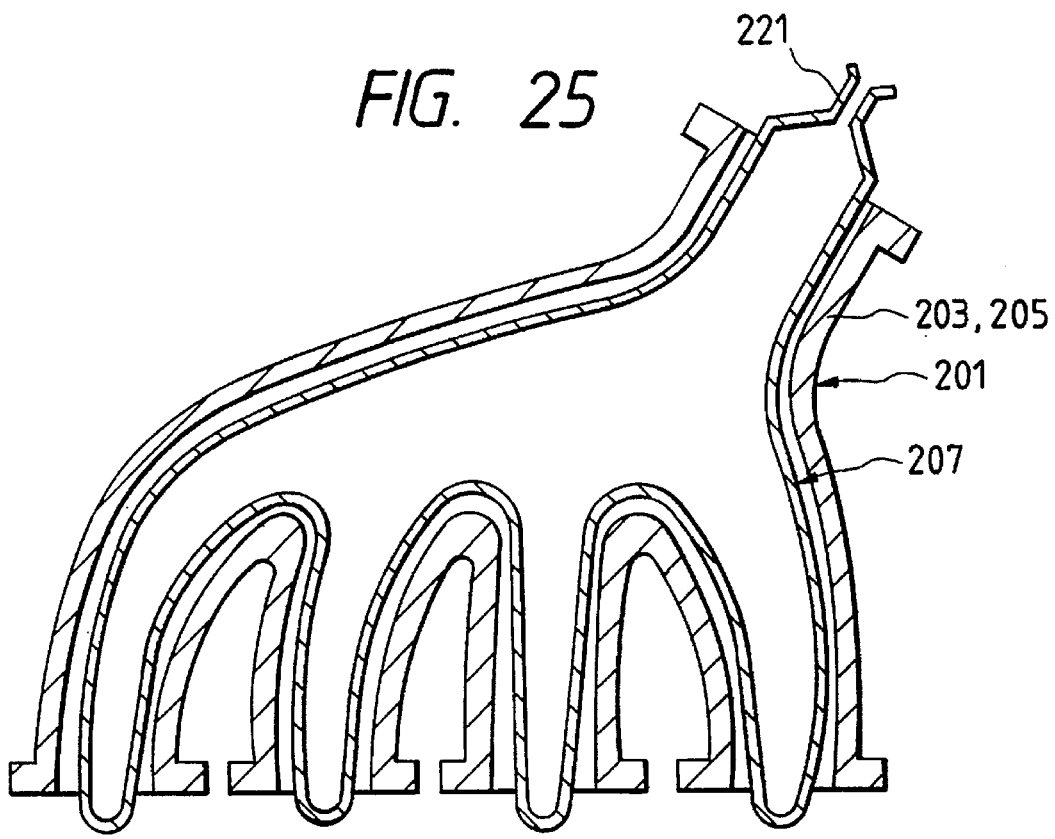
FIG. 25 is a diagram showing the tenth embodiment of the invention and, more specifically, a sectional view showing the arrangement of the internal molding inside the external molding.
Figure 26:
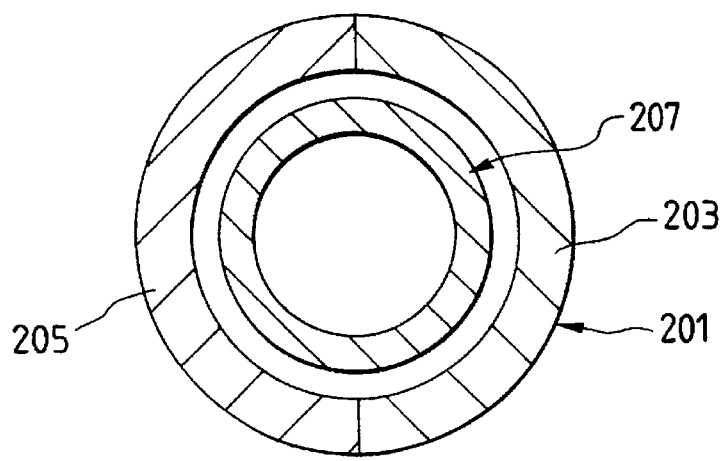
FIG. 26 is a diagram showing the tenth embodiment of the invention and, more specifically, a sectional view showing the arrangement of the internal molding inside the external molding.
Figure 27:
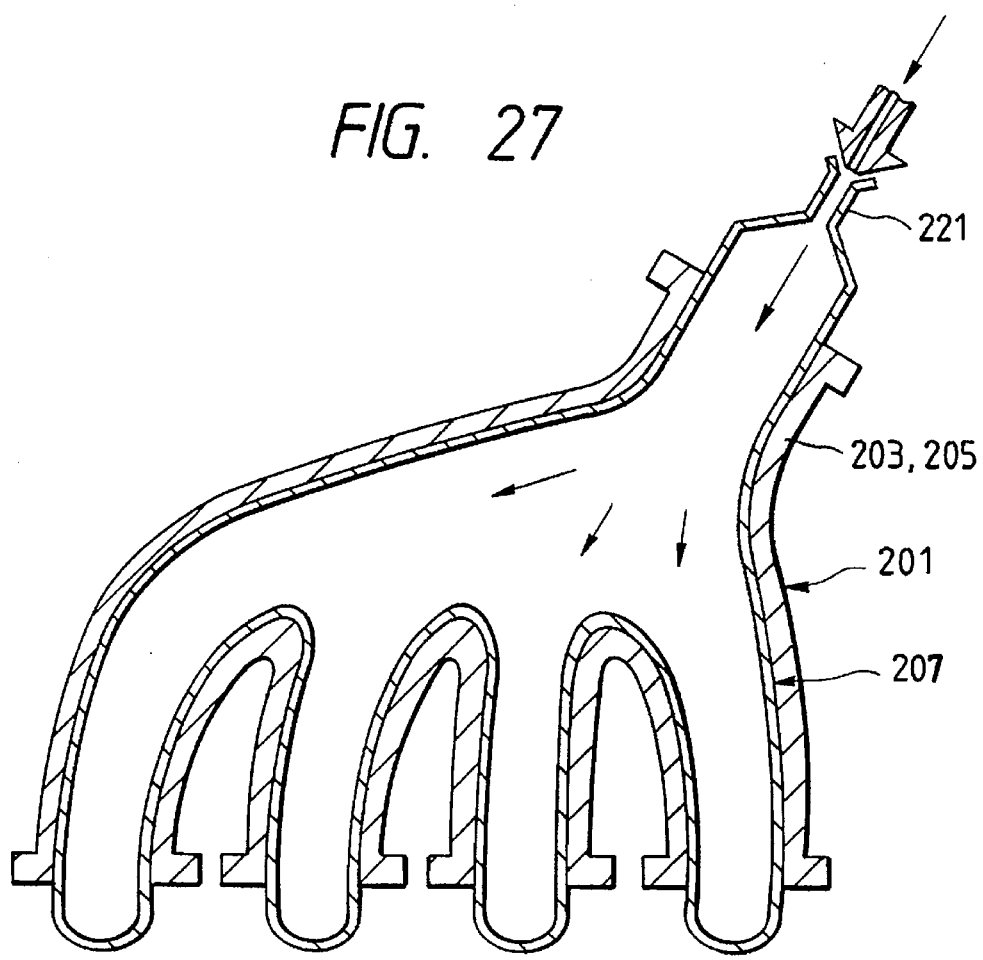
FIG. 27 is a diagram showing the tenth embodiment of the invention and, more specifically, a diagram showing a condition in which the internal molding is heated, has the inside thereof pressurized, and thereby integrated with the external molding.
Figure 28:
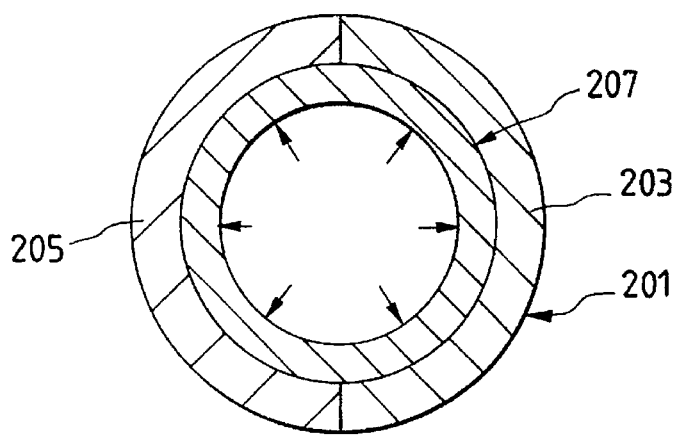
FIG. 28 is a diagram showing the tenth embodiment of the invention and, more specifically, a diagram showing a condition in which the internal molding is heated, has the inside thereof pressurized, and thereby integrated with the external molding.
Figure 29:
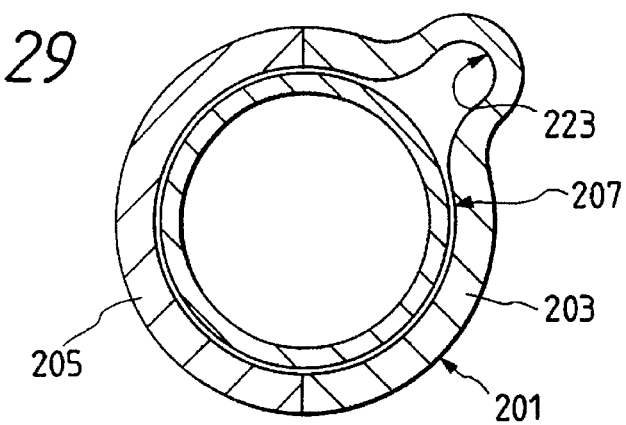
FIG. 29 is a diagram showing the tenth embodiment of the invention and, more specifically, a sectional view showing the arrangement of the internal molding inside an external molding having a specially shaped portion.
Figure 30:
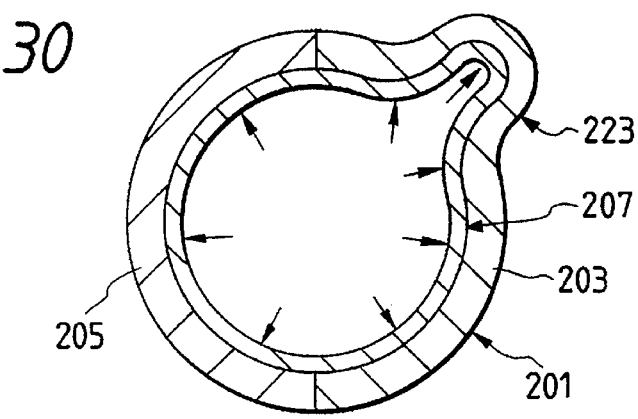
FIG. 30 is a diagram showing the tenth embodiment of the invention and, more specifically, a diagram showing a condition in which the internal molding is heated, has the inside thereof pressurized, and thereby integrated with the external molding having the specially shaped portion.
Figure 31:
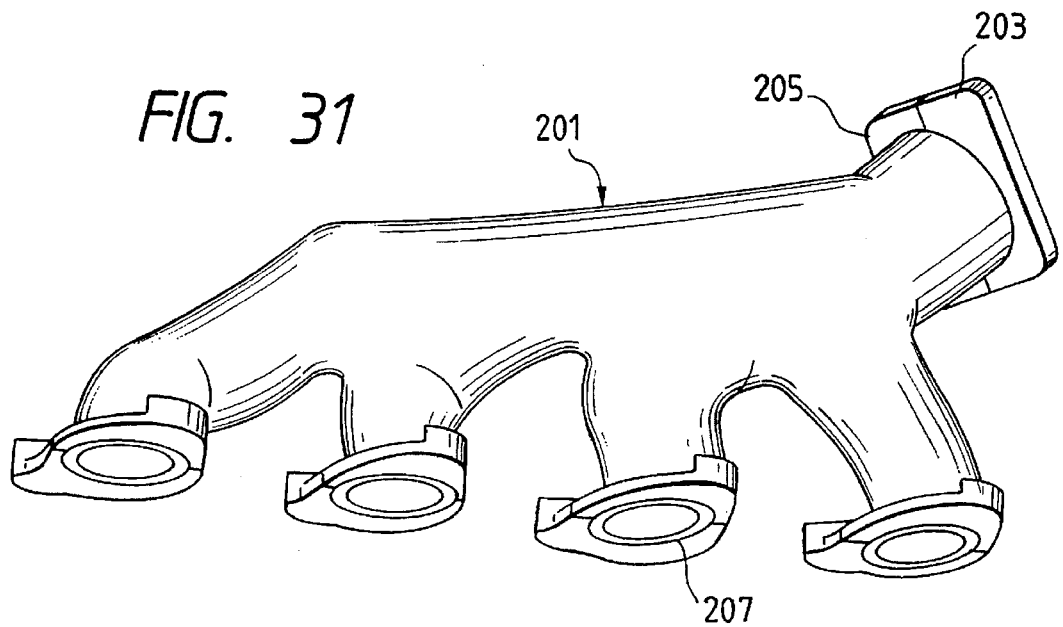
FIG. 31 is a diagram showing the tenth embodiment of the invention and, more specifically, a perspective view showing a finished hollow resin molding.

Then, as shown in FIGS. 25 and 26, the internal molding 207 integrated with the pair of external molding elements 203, 205 with the internal molding 207 inserted into the cavity between the external molding elements and with an adhesive applied to the joining surfaces of the external molding elements and with the joining surfaces put end to end. This integration process may be effected by fusing the joining surfaces of the external molding elements. As a result of this process, the internal molding 207 is arranged inside the external molding 201. Then, under this condition, heated air is blown from the blow inlet 221 of the internal molding 207 as shown in FIGS. 27 and 28 to not only heat and thereby soften the internal molding 207 but also delate the internal molding 207 by internal pressure, so that the internal molding 207 is caused to contact the external molding 201. It should be noted that if the external molding 201 has a specially shaped portion 223 as shown in FIGS. 29 and 30, it is difficult to cause the internal molding 207 to contact the external molding 201 entirely without gap by means of adhesion or the like, but that both moldings can be caused to contact each other without gap by heating, softening, and pressuring. As a result of this process, the internal molding 207 is caused to contact the external molding 201 and is integrated with the external molding 201 as shown in FIG. 31, thus allowing a hollow resin molding 225 without gap to be produced.

The tenth embodiment can provide the following advantages. First, the internal molding is caused to contact the external molding, which allows a hollow resin molding without gap between these moldings to be produced. Therefore, if a product such as a manifold made of a synthetic resin is manufactured, satisfactory contact between the internal molding and the external molding is achieved, which thus excludes the possibility that the manifold will vibrate even if the manifold is evacuated to a negative pressure. In addition, the contact between the internal molding and the external molding over the entire parts thereof keeps the manifold from being deformed by the negative pressure, which hence allows a product of high quality free from defects such as asperities on the inner surface to be obtained.

It should be noted that the invention is not limited to the aforementioned embodiments. For example, while the external molding elements 203, 205 forming the external molding 201 are split into two parts in the direction of circulation of the manifold, the number of parts into which the external molding 201 is split and how the external molding 201 is split can be arbitrarily selected.

Further, the hollow resin molding comes in various shapes. As long as the external molding can have the internal molding inserted thereinto, the external molding 201 may be formed by integrally molding a hollow body.

Still further, while the internal molding 207 is formed by blow molding, the internal molding 207 may be formed by vacuum molding or the like. Moreover, while the film-like internal molding 207 is used, the thickness of the internal molding 207 is arbitrary as long as the internal molding can be softened by heating and dilated by pressurizing.

Still further, conceivable as a means for heating and pressurizing the inside of the internal molding are a method of blowing heated air and the like. For example, a method of sending heated water or oil are available. A method utilizing microwave heating involves the steps of: heating only the internal molding by irradiating microwave to the internal molding while putting metal or metal fibers of, e.g., aluminum into the internal molding; and pressurizing the internal molding by sending a fluid such as air, water, oil, and the like inside the internal molding. Values such as temperature, pressure, and time for heating and pressuring the inside of the internal molding may be selected appropriately in accordance with the thickness of the parison used for the internal molding and with the kind of synthetic resin used.

Embodiment 11

An eleventh embodiment of the invention will be described next with reference to FIGS. 32 to 37. First, the construction of a manifold 301 and the detail of respective moldings 311, 313, 315, 317 will be described. The internal molding 313 having a predetermined shape of the hollow portion of the manifold is integrally formed by blow molding. That is, a cavity portion having an internal shape of the hollow portion of the manifold is formed between the upper and lower molds, and air or the like is charged into the cavity portion between the upper and lower molds by interposing a parison therebetween. As a result of this process, the parison is molded in the form of a thin film along the shape of the cavity portion. The internal molding 313 formed by the aforementioned process includes: a gas sucking end 313C connected to a carburetor; a main circulation portion 313A; a branch portion 313B for distribution to the respective cylinder heads of an engine; and a cylinder head connecting end 313D at the end of the branch section.

On the other hand, the external molding elements 311, 315 having a predetermined shape of the exterior of the manifold 301 and being split into a plurality of parts (into two parts in the direction of circulation of the manifold in the drawing) include: gas sucking ends 311C, 315C; main circulation sections 311A, 315A; passage sections 311B, 315B; and cylinder head connecting ends 311D, 315D at the ends. The outer surfaces of the external molding elements are molded into a predetermined shape of the outer surface of the manifold, whereas the inner surfaces thereof are molded into the same outer surface as that of the internal molding 313, the inner surfaces serving as surfaces for adhesion to the internal molding 313.

Figure 34:
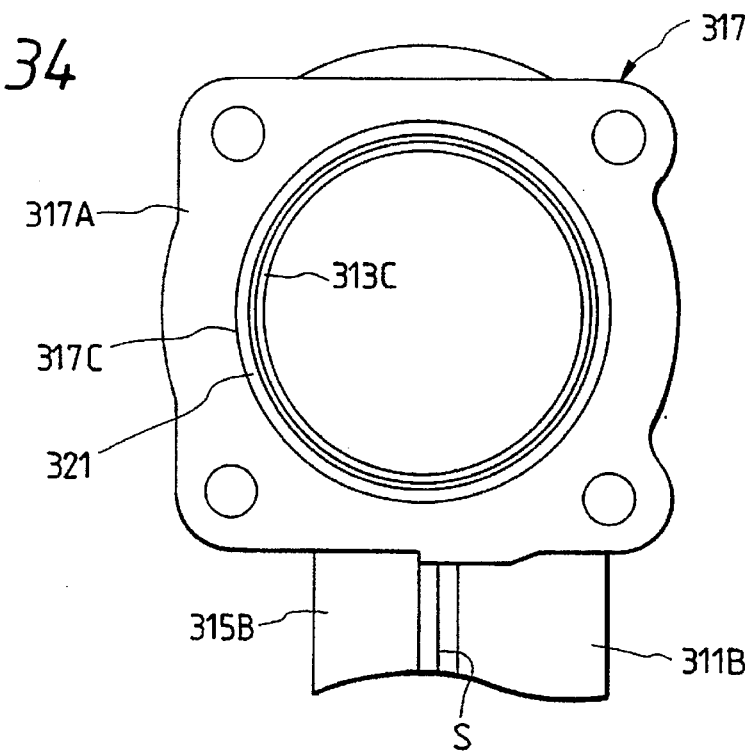
FIG. 34 is a diagram showing the eleventh embodiment of the invention and, more specifically, a front view of a flange member fitted to a gas sucking portion.
Figure 36:
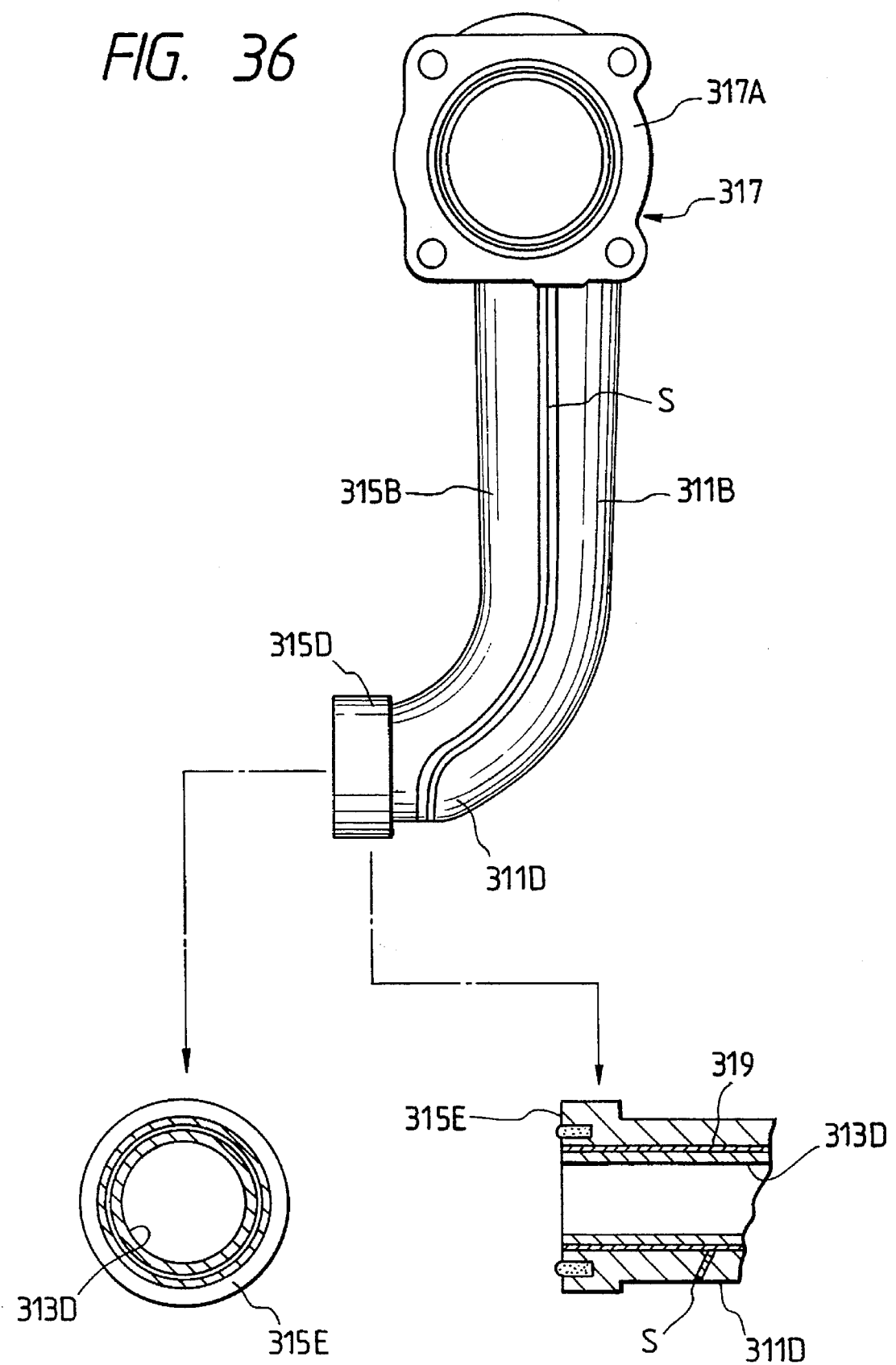
FIG. 36 is a diagram showing the eleventh embodiment of the invention and, more specifically, a side view of a flange surface on the other outlet side as viewed from the gas sucking inlet side including a partial view thereof.

The two split external molding elements 311, 315 seam and cover the internal molding 313 to form joint lines S thereon and are thereby integrated with the internal molding by an adhesive as shown in FIGS. 34, 36.

Figure 35:
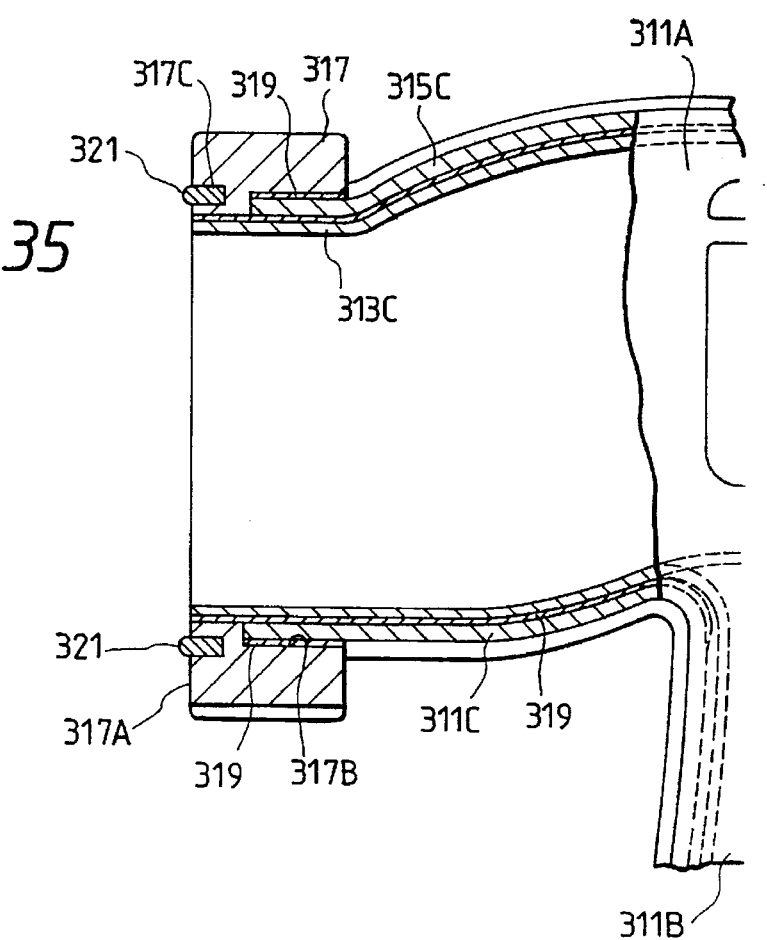
FIG. 35 is a diagram showing the eleventh embodiment of the invention and, more specifically, an enlarged sectional view of the flange member fitted to the gas sucking portion.

The completely shaped flange member 317 is adhesively fixed to the gas sucking portion formed of the gas sucking ends 311C, 315C of the external molding elements 311, 315 and of the gas sucking end 313C of the internal molding 313 in such a manner that a fitting hole 317B of the flange member 317 is fitted to the gas sucking end 313C of the internal molding 313 and is abutted against the end edges of the gas sucking ends 311C, 315C of the external molding elements 311, 315 as shown in FIG. 35. A recessed groove is formed on the flange surface of the flange member, into which a seal member is inserted.

As a result of this construction, the gas sucking portion on the entrance side is provided with good airtightness while keeping satisfactory connection with other members. In addition, the flange surface that is seamless requires no secondary working on itself, which is an additional advantage.

Figure 37:
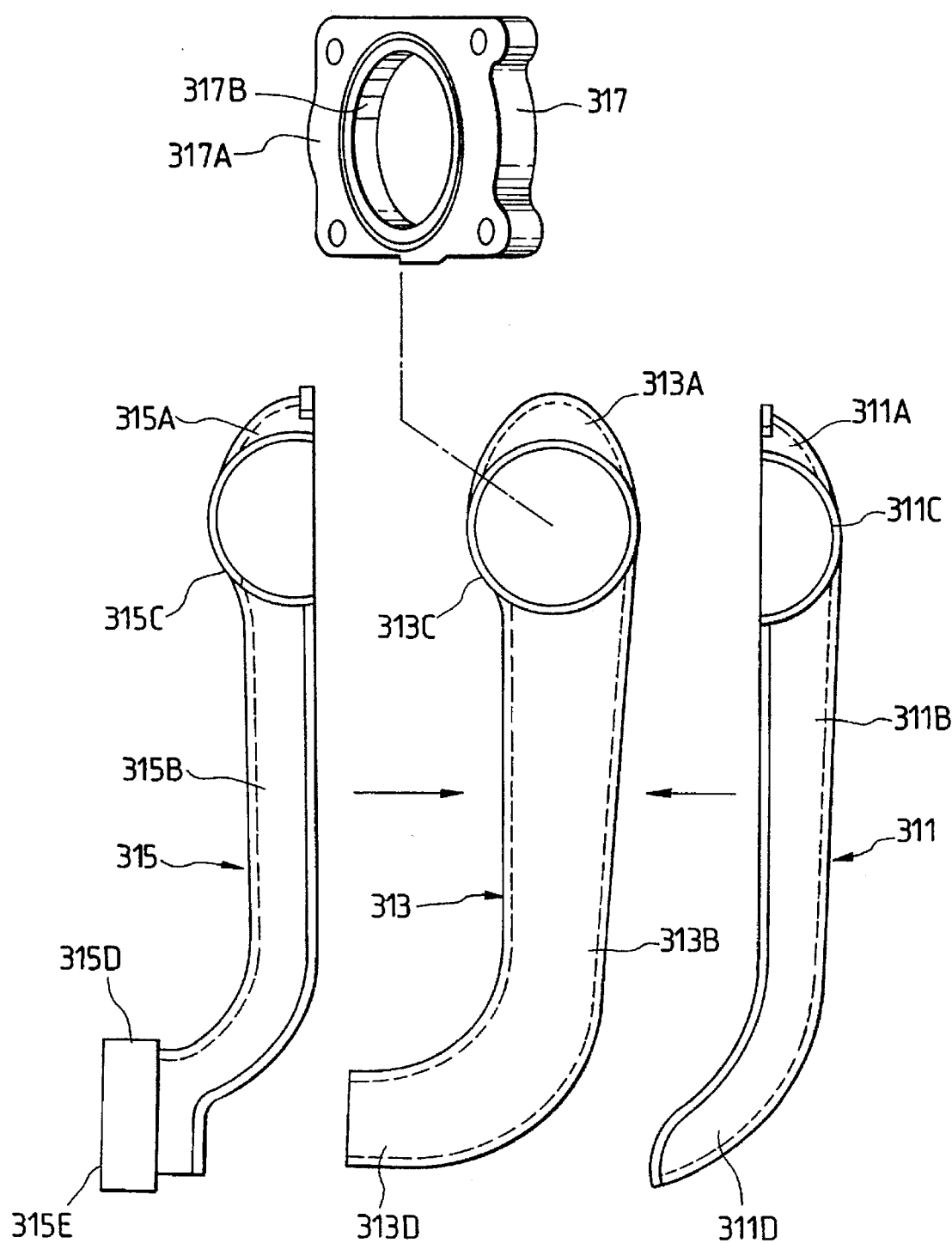
FIG. 37 is a diagram showing the eleventh embodiment of the invention and, more specifically, a perspective view showing respective moldings in exploded form.

A structure such as shown in FIGS. 36, 37 is adopted so that the joint lines S are not formed on a flange surface 315E molded on the cylinder head connecting ends 311D, 315D that are connected to the cylinder heads (including the cylinder head connecting end 313D). That is, the connecting end 315D of the external molding element 315 on one side is molded into a completely shaped flange surface 315E, whereas the connecting end 311D of the external molding element 311 on the other side is formed into a shorter piece while cut before the flange surface 315E. Both external molding elements 315 and 311 are caused to adhere to each other along the joint lines.

As a result of this construction, the flange surface 315E on the exit side, which is a connecting end to be connected to the cylinder head, too is provided with good airtightness while keeping satisfactory connection with other members. In addition, the flange surface that is seamless requires no further working on itself, which is an additional advantage.

The aforementioned eleventh embodiment can provide the following advantages.

The thus made manifold 301 has no step made by the joint lines S on the flange surface even if the manifold 301 of the two layered structure is integrally molded by joining the split external molding elements to each other. In addition, not only the flange end surfaces can be made flush with one another without being subjected to secondary working, but also high airtightness (sealability) can be maintained with good connection with other members.

The invention is not limited to the aforementioned embodiment, but may be modified within the spirit thereof.

For example, the flange member 317 may be applied to connecting portions such as connecting ends 311D, 313D, 315D on the exit side, not limited to the gas sucking ends 311C, 313C, 315C. Further, the method of molding the internal molding 313 may be integrally formed by various appropriate molding means such as vacuum molding. Still further, with respect to the external molding elements split into a plurality of parts, the number of parts into which the external molding elements are split as well as in which direction and in what method the external molding elements are split can be arbitrarily selected, with how the split parts are caused to adhere to each other being also appropriately selected. Still further, the application of the manifold 301 of the invention is not limited to engines, but may be used as a connection member for hollow resin moldings for which airtightness is required in other industrial equipment. Applications to such wide industrial fields fall within the scope of the invention.

Embodiment 12

Figure 38:
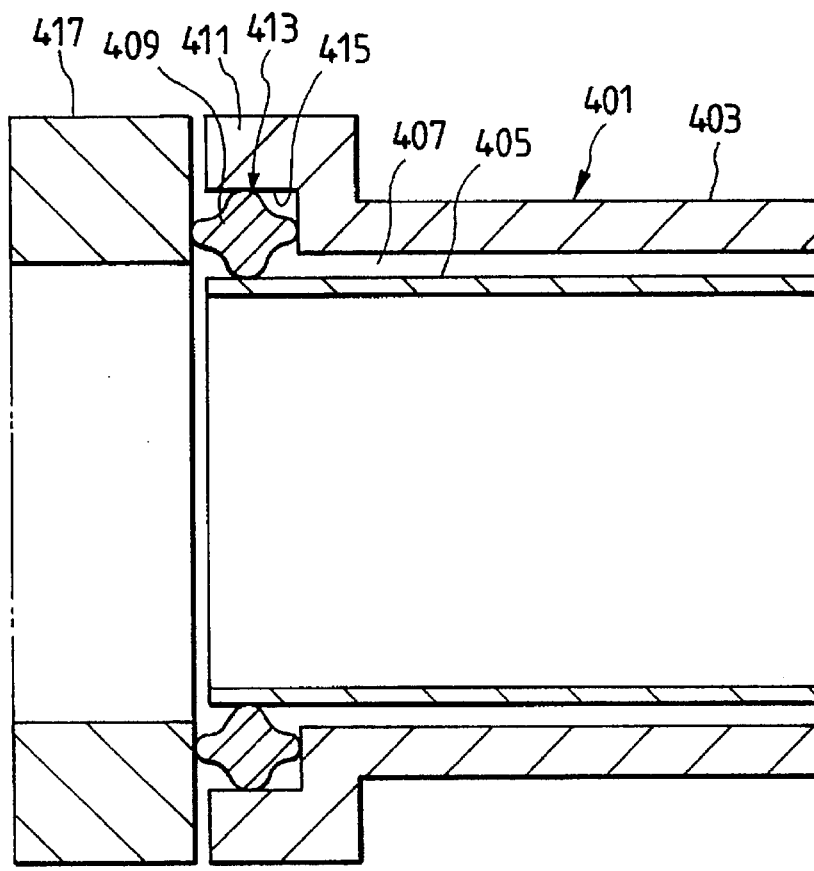
FIG. 38 is a diagram showing a twelfth embodiment of the invention and, more specifically, a sectional view showing a connecting portion between a hollow resin molding and a connected member.

A twelfth embodiment of the invention will be described next with reference to FIG. 38. FIG. 38 shows an end portion of an intake manifold 401, which is a hollow resin molding. The manifold 401 includes: an external molding 403 having a predetermined shape of the exterior of the manifold 401 as a hollow resin molding; and an internal molding 405 having a predetermined shape of a hollow portion of the manifold 401. First, the internal molding 405 having the predetermined shape of the hollow portion of the manifold and the external molding 403 having the predetermined shape of the exterior of the manifold are molded. The external molding 403 has plural split molding elements. Then, the manifold 401 having the predetermined shape is formed by either causing the external molding elements of external molding 403 to adhere to each other or fuse with each other with the internal molding 405 interposed therebetween. A gap is provided between the external molding 403 and the internal molding 405 of the aforementioned manifold 401.

A seal member 409 is inserted into a gap portion 407 at the end portion of the hollow portion of the manifold 401. That is, a flange portion 411 is formed at an end portion of the external molding 403, and a groove portion 413 is formed over the entire circumference of the flange portion 411. The groove portion 413 is continuous to the gap portion 407, with one side thereof being formed of the internal molding 405 and with the other side thereof being formed of a stepped portion 415 arranged on the external molding so as to be recessed. The packing 409, which is the seal member, is inserted into the groove portion 413. The packing 409 is substantially cross-like in section and is disposed in such a manner that one of projected portions thereof projecting in the direction orthogonal to the axial direction of the hollow portion of the manifold 401 projects toward the internal molding 405 and that the other projected portion thereof projects toward a side of the stepped portion 415.

The packing 409 is also disposed in such a similar manner that one of projected portions thereof projecting in the axial direction of the hollow portion of the manifold 401 projects toward the bottom of the stepped portion 415 and that the other projected portion thereof projects toward the connecting surface of the connected member 417 confronting the flange portion 411.

Then, the end portion of the hollow portion of the manifold 401 is connected to the connecting surface of the connected member 417. At this instance, the packing 409 is deformed by the connecting pressure, so that one of the projected portions thereof projecting in the direction orthogonal to the axial direction of the hollow portion of the manifold 401 is abutted against the internal molding 405 and the other projected portion thereof is abutted against the side of the stepped portion 415, which in turn closes the gap portion 407. In addition, the projected portion of the packing 409 projecting in the axial direction of the hollow portion of the manifold 401 is abutted against the bottom of the stepped portion 415 and the other projected portion thereof is abutted against the connecting surface of the connected member 417. This closes the gap potion 407 with the packing 409 and thereby checks a fluid passing through the hollow portion from entering into the gap portion 407. The packing 409 also prevents leakage of the fluid passing through the space between the manifold 401 and the connected member 417.

The aforementioned twelfth embodiment can provide the following advantages. First, the packing is used to close the gap portion between the external molding and the internal molding at the end portion of the hollow portion. Therefore, ingress of the substance circulating through the hollow portion into the gap portion can be prevented, thereby eliminating various kinds of inconvenience to be associated with such ingress. For example, in the case of an intake manifold of an automobile, entrance of the mixture into the gap portion can be prevented, which in turn liquefies gasoline to make particles larger. As a result, the large particles are no longer sucked into the engine, thereby implementing smooth engine operation.

Further, the use of the packing not only as a seal member for the gap portion but also as a seal member for the connected member contributes to achieving a simple structure as well as easy fabrication.

Embodiment 13

Figure 39:
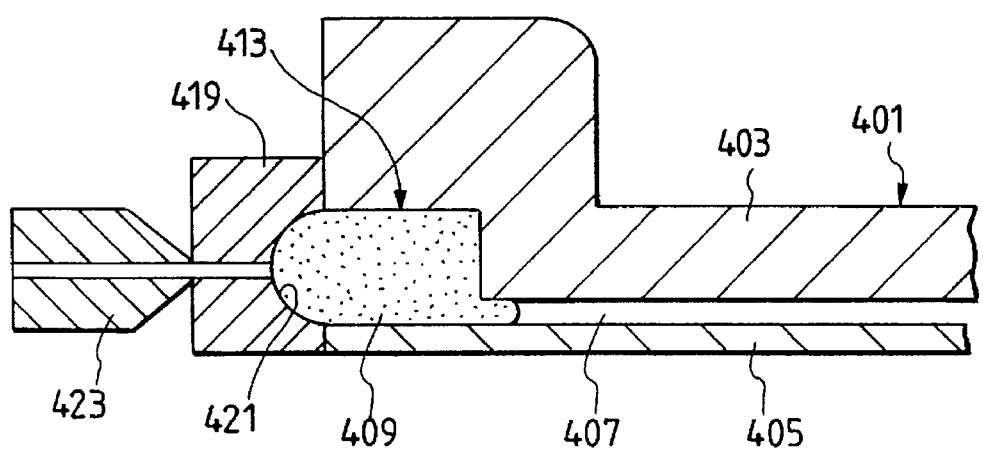
FIG. 39 is a diagram showing a thirteenth embodiment of the invention and, more specifically, a sectional view showing an end portion of a hollow resin molding.

A thirteenth embodiment of the invention will be described next with reference to FIG. 39. The thirteenth embodiment is characterized as arranging a cap mold 419 at a gap portion 407 between the external molding 403 and the internal molding 405 in an end portion of a hollow resin molding 401 and inserting a seal member 409 into a space formed between the aforementioned groove portion 413 and the cap mold 419 by charging a resilient material into such space. That is, the gap portion 407 has a groove portion 413 in a manner similar to that of Embodiment 12. The cap mold 419 is attached to the groove portion 413. The cap mold 419 has a space 421 of predetermined shape, the space being projected toward a connected member. A liquid resilient material is charged into both the space 421 of the cap mold 419 and the space of the groove portion 413 through a nozzle 423 to form a seal member 409. Not only the seal member 409 closes the gap portion 407, but also a part of the seal member 409, being projected to the connected member, serves the function as a packing when the manifold is connected to the connected member.

Since this embodiment too is designed to close the gap portion 407 between the internal molding 405 and the external molding 403 with a seal member 409 in the end portion of the hollow portion, infiltration of the fluid passing through the hollow portion into the gap portion can be prevented, thereby eliminating various kinds of inconvenience to be accompanied by such infiltration. Moreover, since the seal member 409 is arranged by charging a resilient material and this seal member is used also as the packing, such a secondary working process as inserting the packing is no longer necessary, which in turn facilitates fabrication.

Embodiment 14

Figure 40:
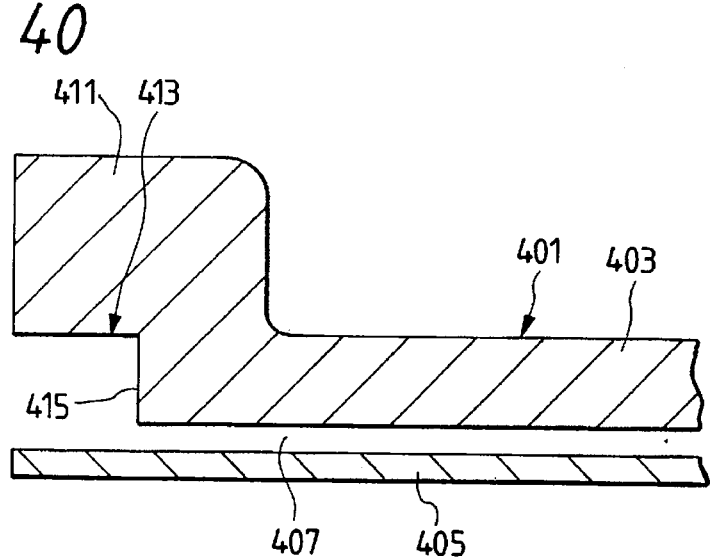
FIG. 40 is a diagram showing a fourteenth embodiment of the invention and, more specifically, a sectional view showing an end portion of a hollow resin molding.

A fourteenth embodiment of the invention will be described next with reference to FIGS. 40 to 45. The fourteenth embodiment is characterized as narrowing an end portion of a seal inserting portion. That is, as shown in FIG. 40, a flange portion 411 is formed on an end portion of the external molding 403, and a groove portion 413 is formed over the entire circumference of the flange portion 411. One side of the groove portion 413 is formed of the internal molding 405, and the other side thereof is formed of the stepped porion 415 on the external molding 403 so as to be recessed.

Figure 41:
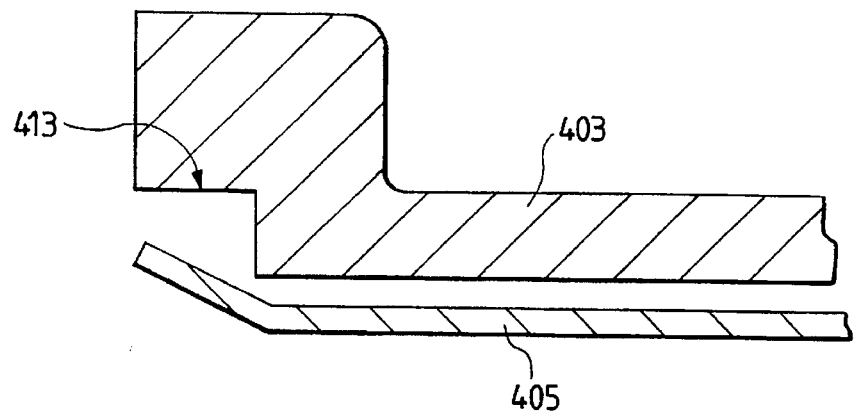
FIG. 41 is a diagram showing the fourteenth embodiment of the invention and, more specifically, a sectional view showing an end portion of the hollow resin molding.
Figure 42:
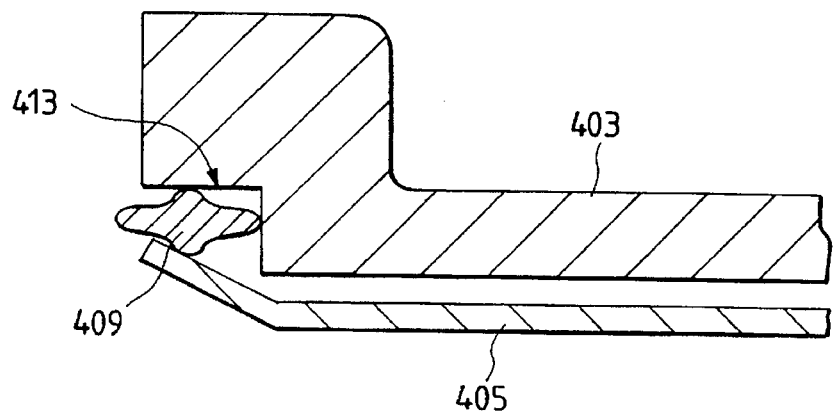
FIG. 42 is a diagram showing the fourteenth embodiment of the invention and, more specifically, a sectional view showing an end portion of the hollow resin molding.

As shown in FIG. 41, the end portion of the internal molding 405 is deformed toward the external molding 403 to narrow the end portion of the groove portion 413 as a seal member inserting portion, and as shown in FIG. 42, the packing 409, which is the seal member, is inserted into the groove portion 413.

Figure 43:
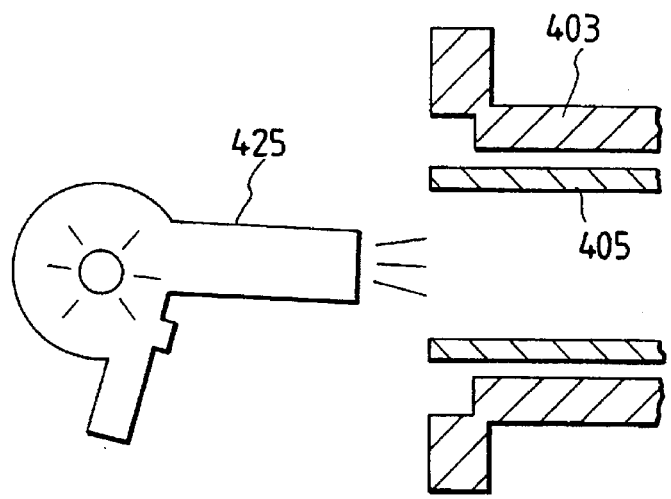
FIG. 43 is a diagram showing the fourteenth embodiment of the invention and, more specifically, a diagram illustrative of a condition in which an internal molding is heated and softened.
Figure 44:
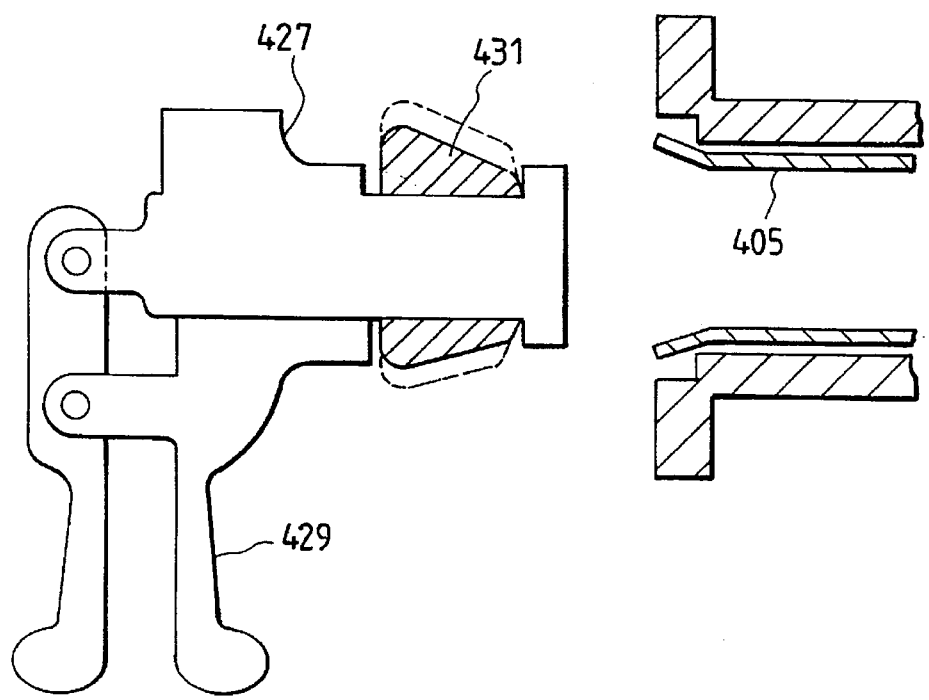
FIG. 44 is a diagram showing the fourteenth embodiment of the invention and, more specifically, a diagram illustrative of a condition in which the internal molding is expanded.

A method of expanding the end portion of the internal molding 405 such as shown in FIGS. 43, 44 is available. First, as shown in FIG. 43, hot air is blown to the end portion of the internal molding 405 with a dryer 425 or the like so that the internal molding 405 can be heated and softened. Then, as shown in FIG. 44, the end portion of the internal molding 405 is expanded using a tube expanding tool 427 that causes a tapered heat-resistant, resilient expanding member 431 to be contracted and expanded by the operation of a handle 429. That is, the expanding member 431 is inserted into the end portion of the internal molding 405 to expand such end portion.

Figure 45:
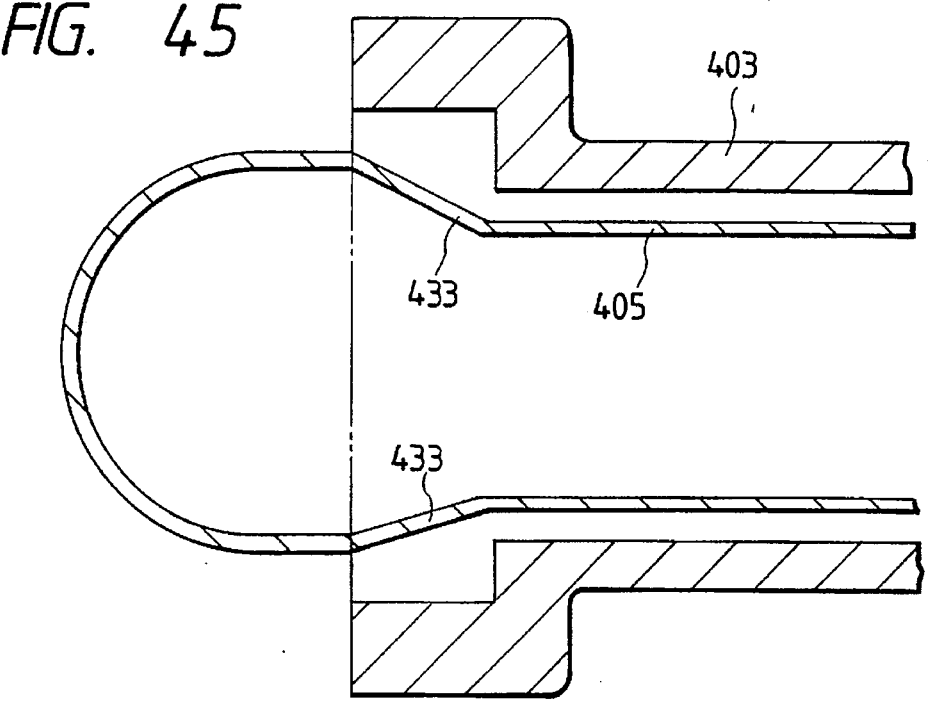
FIG. 45 is a diagram showing the fourteenth embodiment of the invention and, more specifically, a diagram showing another method of causing the internal molding to be deformed toward the external molding.

As shown in FIG. 45, another method involves the steps of: forming a slope portion 433 extending toward the external molding in advance in the internal molding 405 when the internal molding 405 is blow molded; and cutting the internal molding 405 along the two dot chain line after the internal molding 405 has been integrated with the external molding 403.

It should be noted that the end portion of the seal member inserting portion may be narrowed by narrowing the end portion of the groove portion on the external molding side so as to be dovetail-like, or by combining the process of deforming the internal molding 405 and the process of arranging a dovetail groove.

According to the fourteenth embodiment, a seal member is used to close the gap portion between the external molding 403 and the internal molding 405 in the end portion of the hollow portion. Therefore, infiltration of the fluid passing through the hollow portion into the gap portion can be prevented, which in turn precludes various kinds of inconvenience to be brought about by such infiltration from occurring. Moreover, the end portion of the seal member inserting portion is narrowed by deforming the end portion of the internal molding 405 so as to extend toward the external molding 403 and by a like means, which makes the seal member 409 hard to come off and hence contributes to reinforcing the sealing.

Embodiment 15

Figure 46:
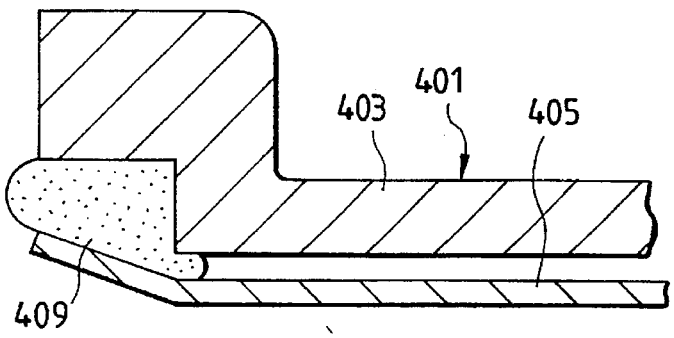
FIG. 46 is a diagram showing a fifteenth embodiment of the invention and, more specifically, a sectional view showing an end portion of a hollow resin molding.

A fifteenth embodiment of the invention will be described next with reference to FIG. 46. The fifteenth embodiment is characterized as not only narrowing the end portion of the seal member inserting portion, but also arranging a cap mold 419 at the gap portion 407 and charging a resilient material into a space formed by the gap portion 407 and the cap mold 419 to insert the seal member 409. That is, this embodiment is a combination of Embodiments 13 and 14. The manufacturing method is similar to those of Embodiments 13 and 14. Since the gap portion 407 is closed by the seal member 409, this embodiment too can prevent infiltration of the fluid passing through the hollow portion into the gap portion, thereby precluding various kinds of inconvenience arising from such infiltration from occurring. In addition, since the seal member 409 is inserted by charging the resilient material and is used also as the packing, a secondary working such as inserting the packing is no longer necessary, thus facilitating the fabrication. Moreover, the end portion of the internal molding 405 is narrowed by deforming the end portion of the internal molding 405 so as to extend toward the external molding 403 and by a like means, which makes the seal member 409 hard to come off and hence contributes to reinforcing the sealing.

Embodiment 16

Figure 47:
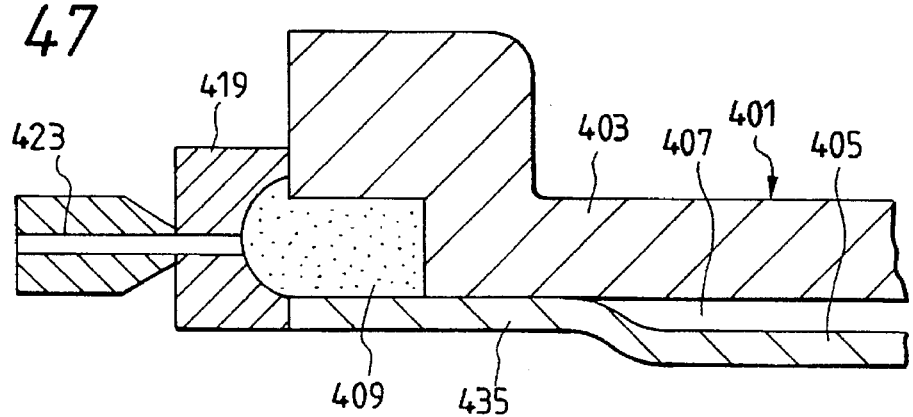
FIG. 47 is a diagram showing a sixteenth embodiment of the invention and, more specifically, a sectional view showing an end portion of a hollow resin molding.

A sixteenth embodiment of the invention will be described next with reference to FIGS. 47 to 49. The sixteenth embodiment is characterized as inserting the seal member by charging a resilient material using a cap mold after a slightly inward portion with respect to an end portion of the internal molding has been expanded and caused to contact the external molding.

Figure 48:
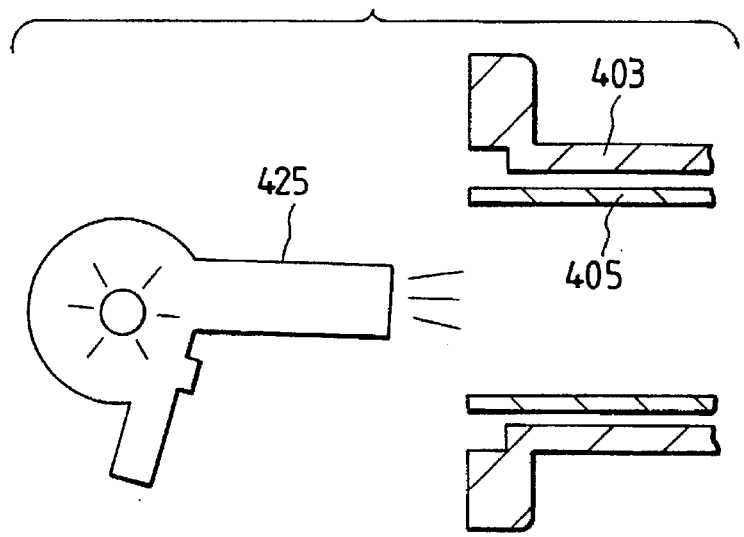
FIG. 48 is a diagram showing the sixteenth embodiment of the invention and, more specifically, a diagram illustrative of a condition in which an internal molding is heated and softened.
Figure 49:
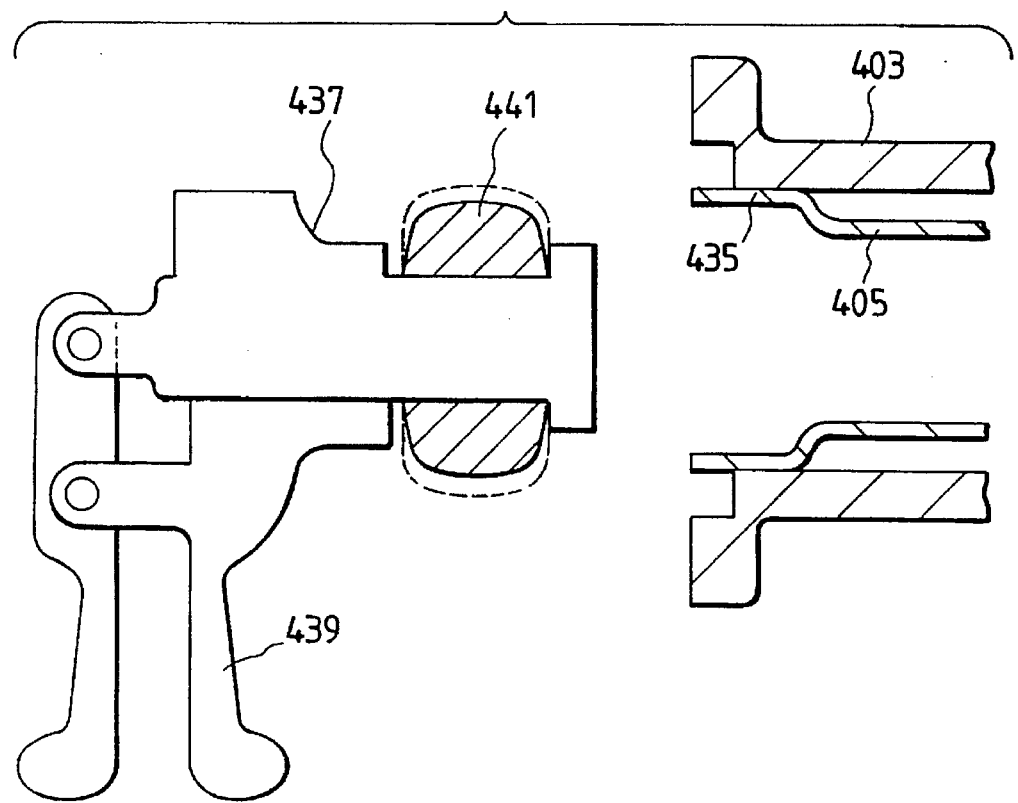
FIG. 49 is a diagram showing the sixteenth embodiment of the invention and, more specifically, a diagram illustrative of a condition in which the internal molding is expanded.

A method of expanding the internal molding such as shown in FIGS. 48 and 49 is available. First, as shown in FIG. 48, hot air is blown to the end portion of the internal molding 405 with a dryer or the like so that the internal molding 405 can be heated and softened. Then, as shown in FIG. 49, the end portion of the internal molding is expanded using a tube expanding tool 437 that causes a heat-resistant, resilient expanding member 441 to be contracted and expanded by the operation of a handle 439, the expanding member 441 being semicylindrical in section. That is, the expanding member 441 is inserted into the end portion of the internal molding 405 to expand such end portion.

Then, the cap mold 419 is arranged at the gap portion, and the seal member 409 is inserted by charging the resilient material into the space formed by the gap portion 407 and the cap mold.

Since the gap portion 407 is closed by the seal member 409, this embodiment too can prevent infiltration of the fluid passing through the hollow portion into the gap portion, thereby precluding various kinds of inconvenience arising from such infiltration from occurring. In addition, since the seal member 409 is inserted by charging the resilient material and is used also as the packing, a secondary working such as inserting the packing is no longer necessary, thus facilitating the fabrication. Moreover, infiltration of the charged resilient material into the gap portion 407 is blocked, which prevents wasting of the seal member 409.

Embodiment 17

Figure 50:
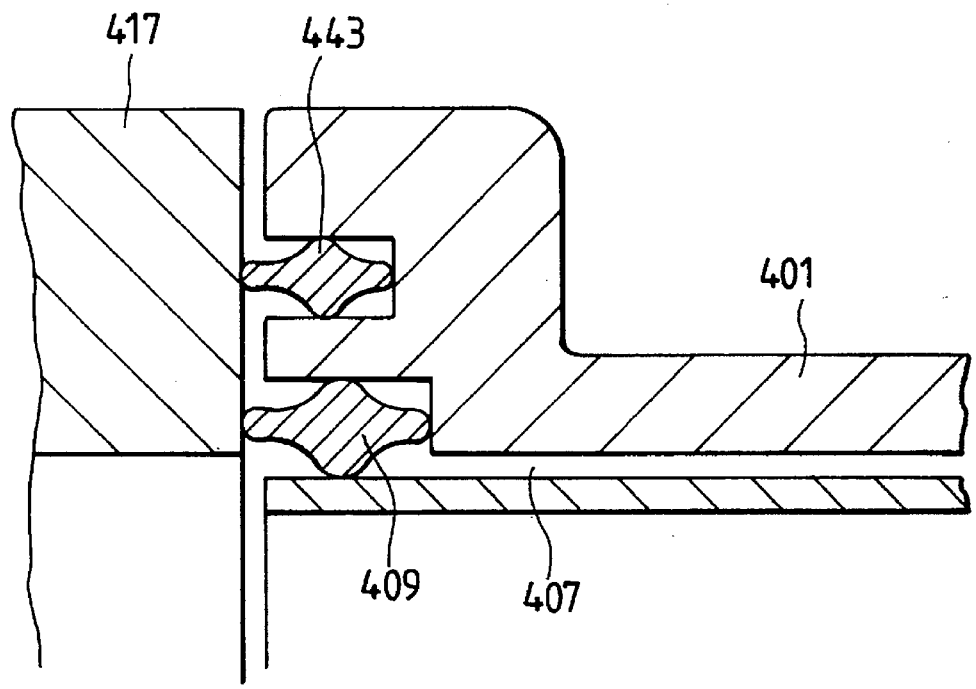
FIG. 50 is a diagram showing a seventeenth embodiment of the invention and, more specifically, a sectional view showing an example in which a seal member is inserted independently of a packing.
Figure 51:
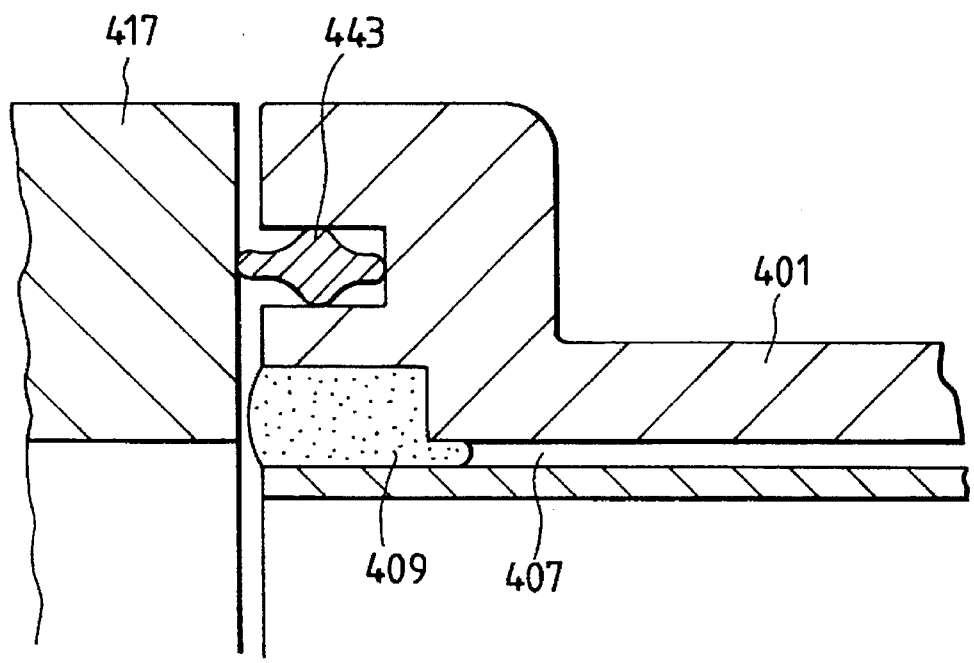
FIG. 51 is a diagram showing the seventeenth embodiment of the invention and, more specifically, a sectional view showing an example in which a seal member is inserted independently of a packing.

A seventeenth embodiment of the invention will be described next with reference to FIGS. 50 and 51. The seventeenth embodiment is characterized as using a packing or a resilient material as the seal member 409 for closing the gap portion 407 and inserting a separate packing 443 between the manifold and the connected member 417, unlike the aforementioned embodiments in which the seal member 409 serves also as the packing. While the packing 409 that is substantially cross-like in section is shown in the drawing, an O ring may also be used.

As described in the foregoing, according to the methods of manufacturing a hollow resin molding and a manifold made of a synthetic resin of the invention, a manifold that is free from defects on the inner surface of the hollow portion can be produced. Further, the internal molding is light and therefore easy to handle. Since injection molding is not involved, no reinforcement is required, which permits easy manufacture. Still further, the internal molding and the external molding can be integrated with each other by causing the former to contact the latter, which provides the advantage of leaving no gap between the internal molding and the external molding, thereby allowing a product free from defects such as asperities on the inner surface to be manufactured. Still further, since the completely shaped flange is fitted to the connecting portion formed by the internal molding and the external molding elements, the flange surface at the connecting portion is seamless, which not only ensures satisfactory airtightness with good connection with other members, but also requires no secondary working on the flange surface, thus contributing to a reduction in the cost of manufacture as well as an increase in productivity. Still further, since the seal member is inserted into the gap portion between the internal molding and the external molding, a hollow resin molding whose airtightness is improved and which prevents infiltration of a fluid passing through the hollow portion can be obtained.

What is claimed is:

1. A method of manufacturing a hollow resin molding comprising the steps of:

forming an external molding having a predetermined shape of an exterior of said hollow resin molding and being split into a plurality of parts;

forming an internal molding having a predetermined shape of a hollow portion of said hollow resin molding; and integrating said internal molding with said external molding;

wherein a seal member is inserted into a gap portion at an end portion of said hollow resin molding as well as between said external molding and said internal molding, to form said hollow resin molding.

2. The method of manufacturing a hollow resin molding according to claim 1, wherein a packing is inserted as said seal member.

3. The method of manufacturing a hollow resin molding according to claim 1, wherein a cap mold is arranged at said gap portion at said end portion of said hollow resin molding as well as between said external molding and internal molding, and wherein said seal member is inserted into said gap portion by charging a resilient material into a space formed by said gap portion and said cap mold.

4. The method of manufacturing a hollow resin molding according to claim 1, 2, or 3, wherein an end portion of a seal member inserting portion is narrowed.

5. A method of manufacturing a hollow resin molding according to claim 4, wherein an end portion of said internal molding is heated and softened by blowing hot air thereto, and is thereafter expanded with a tube expanding tool by inserting said tube expanding tool thereinto from said end portion of said internal molding.

6. A method of manufacturing a hollow resin molding according to claim 4, wherein a slope portion extending toward said external molding is molded in advance in said internal molding, and an unnecessary portion of said slope portion is eliminated after said internal molding has been integrated with said external molding.

7. A method of manufacturing a hollow resin molding according to claim 1 or 3, wherein a slightly inward portion with respect to an end portion of said internal molding is expanded to cause said internal molding to contact said external molding, and wherein a seal member is thereafter inserted.

8. A method of manufacturing a hollow resin molding according to claim 7, wherein said end portion of said internal molding is heated and softened by blowing hot air thereto, and is expanded with a tube expanding tool by inserting said tube expanding tool thereinto from said end portion of said internal molding.

9. A method of manufacturing a hollow resin molding according to claim 1, 2 or 3, further comprising:

a separate packing inserted into a recess formed at a surface of an end portion of said external molding.

10. A method of manufacturing a manifold made of a synthetic resin, said method comprising the steps of:

forming an external molding having a predetermined shape of an exterior of said manifold;

forming an internal molding having a predetermined shape of a hollow portion of said manifold;

integrating said internal molding with said external molding by inserting a seal member into a gap portion between said external molding and said internal molding to form said manifold.

11. The method of manufacturing a manifold made of a synthetic resin according to claim 10, wherein in said step of forming an external molding the external molding is formed from a plurality of split parts.

* * * * *